(12) United States Patent
Fujinaga

(10) Patent No.: US 9,104,705 B2
(45) Date of Patent: Aug. 11, 2015

(54) IMAGE DISPLAY METHOD, IMAGE DISPLAY APPARATUS, IMAGE RECORDING APPARATUS, AND IMAGE PICKUP APPARATUS

(75) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 792 days.

(21) Appl. No.: 12/276,593

(22) Filed: Nov. 24, 2008

(65) Prior Publication Data

US 2009/0167783 A1 Jul. 2, 2009

(30) Foreign Application Priority Data

Dec. 28, 2007 (JP) ................................. 2007-340543

(51) Int. Cl.
*G06F 17/30* (2006.01)
*G06F 3/0485* (2013.01)

(52) U.S. Cl.
CPC ............................... *G06F 17/30274* (2013.01)

(58) Field of Classification Search
CPC . G06F 3/0482; G06F 3/0485; G06F 3/04855; G06F 17/30274; H05M 1/27455; H04M 1/27455
USPC .......... 715/821, 823, 828–831, 834, 838, 859
See application file for complete search history.

(56) References Cited

U.S. PATENT DOCUMENTS

| | | | |
|---|---|---|---|
| 5,790,820 A * | 8/1998 | Vayda et al. ................... | 715/834 |
| 6,348,936 B1 * | 2/2002 | Berteig ......................... | 715/856 |
| 7,134,092 B2 * | 11/2006 | Fung et al. .................... | 715/779 |
| 7,418,671 B2 * | 8/2008 | Hama et al. ................... | 715/830 |
| 7,516,419 B2 * | 4/2009 | Petro et al. .................... | 715/834 |
| 7,581,195 B2 * | 8/2009 | Sciammarella et al. ...... | 715/838 |
| 7,730,425 B2 * | 6/2010 | de los Reyes et al. ........ | 715/835 |
| 7,970,240 B1 * | 6/2011 | Chao et al. .................... | 382/305 |
| 8,028,249 B2 * | 9/2011 | Loui et al. ..................... | 715/835 |
| 8,077,144 B2 * | 12/2011 | Honda ........................... | 345/156 |
| 8,266,546 B2 * | 9/2012 | Candrian et al. .............. | 715/815 |
| 8,375,334 B2 * | 2/2013 | Nakano et al. ................ | 715/848 |
| 8,599,298 B2 * | 12/2013 | Sasaki et al. ............ | 348/333.05 |
| 8,615,720 B2 * | 12/2013 | Bradea .......................... | 715/835 |
| 8,694,917 B2 * | 4/2014 | Yasui et al. .................... | 715/810 |
| 2003/0112357 A1 * | 6/2003 | Anderson ................ | 348/333.05 |

(Continued)

FOREIGN PATENT DOCUMENTS

| | | |
|---|---|---|
| JP | 2000-076281 A | 3/2000 |
| JP | 2000-357036 A | 12/2000 |

(Continued)

*Primary Examiner* — Andrew Tank
(74) *Attorney, Agent, or Firm* — Canon USA Inc. IP Division

(57) ABSTRACT

Data elements are extracted from data elements stored in a storage medium in accordance with two conditions and grouped into first and second groups. The data elements in the first group and those in the second group are displayed in regions distinguished from each other on a screen. In response to user manipulation, the screen is switched to a screen that allows searching data elements in the first or second group displayed in a region corresponding to the manipulation. In searching many diverse data elements stored in a data storage, the user can select a group from groups of data elements extracted by different conditions and search the data elements in the selected group. Accordingly, the user can search data elements more readily even when many diverse data elements are stored in the storage medium.

19 Claims, 32 Drawing Sheets

(56) References Cited

U.S. PATENT DOCUMENTS

| | | | |
|---|---|---|---|
| 2004/0078383 A1* | 4/2004 | Mercer et al. | 707/102 |
| 2004/0155907 A1 | 8/2004 | Yamaguchi | |
| 2005/0183040 A1* | 8/2005 | Kondo et al. | 715/841 |
| 2005/0210403 A1* | 9/2005 | Satanek | 715/786 |
| 2005/0259116 A1* | 11/2005 | Araoka | 345/619 |
| 2006/0098105 A1* | 5/2006 | Okisu et al. | 348/231.99 |
| 2007/0089061 A1* | 4/2007 | Terada | 715/723 |
| 2007/0271528 A1* | 11/2007 | Park et al. | 715/810 |
| 2008/0155475 A1* | 6/2008 | Duhig | 715/830 |
| 2010/0122214 A1* | 5/2010 | Sengoku | 715/830 |
| 2010/0281084 A1* | 11/2010 | Gupta et al. | 707/822 |

FOREIGN PATENT DOCUMENTS

| | | |
|---|---|---|
| JP | 2001-067163 A | 3/2001 |
| JP | 2004-295159 | 10/2004 |
| JP | 2004-363707 | 12/2004 |
| JP | 2005-078152 A | 3/2005 |

* cited by examiner

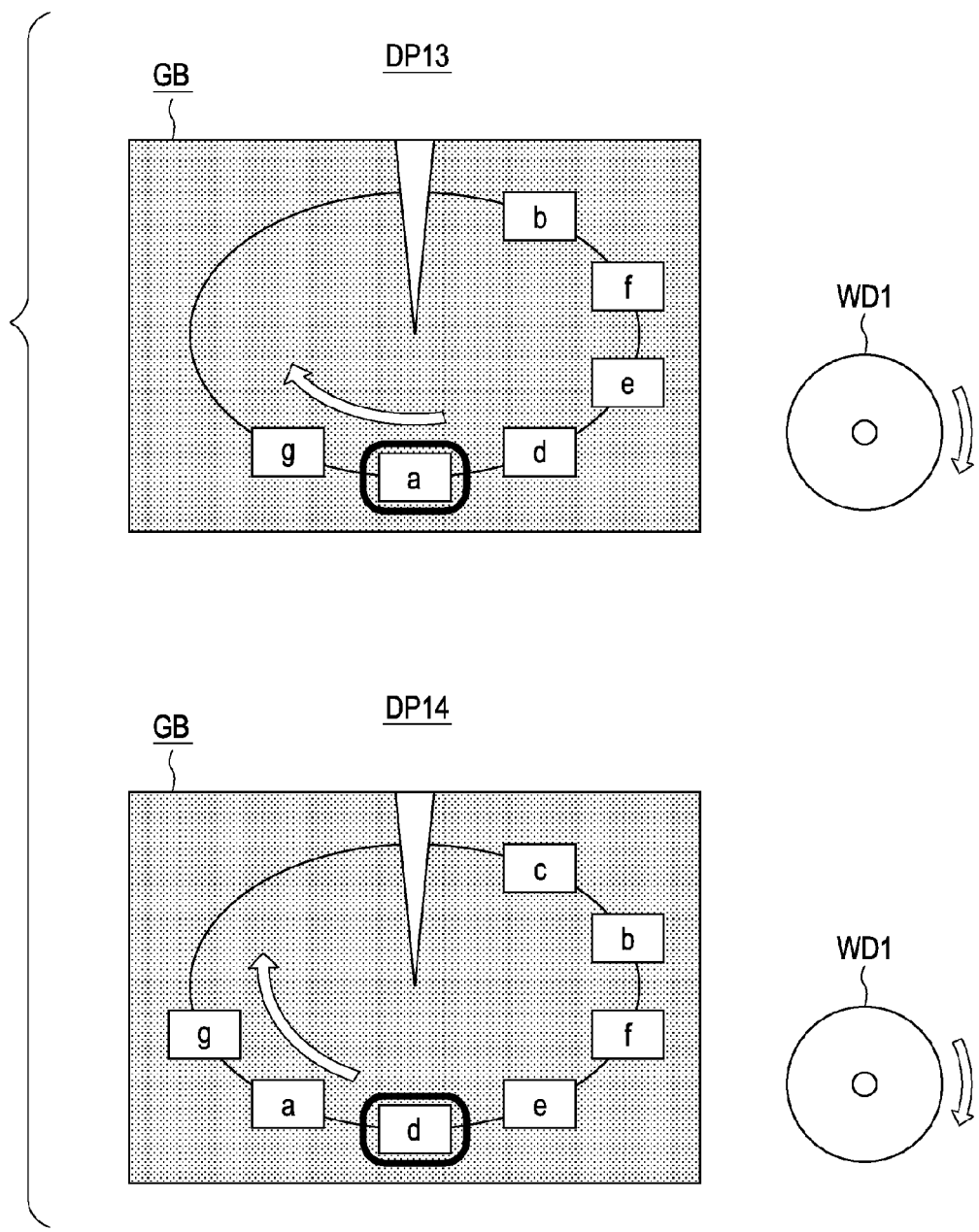

FIG. 10
DP21
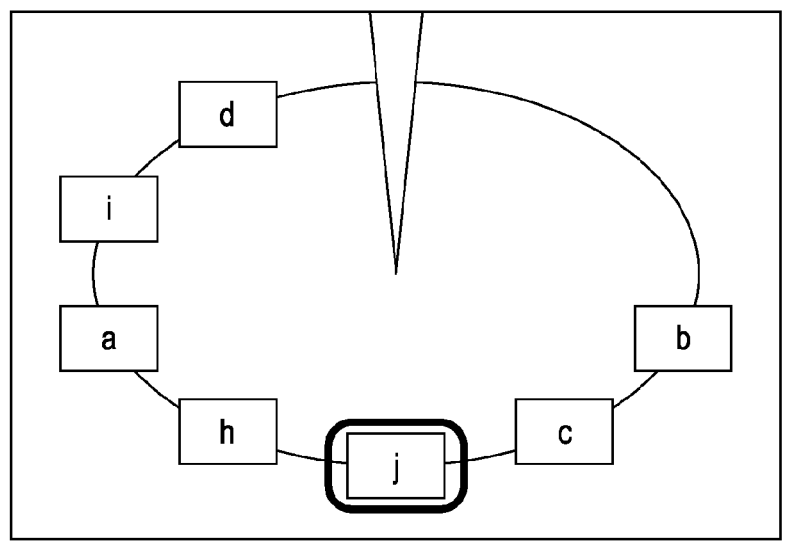
⬇ HOME KEY K4 IS PRESSED
DP1
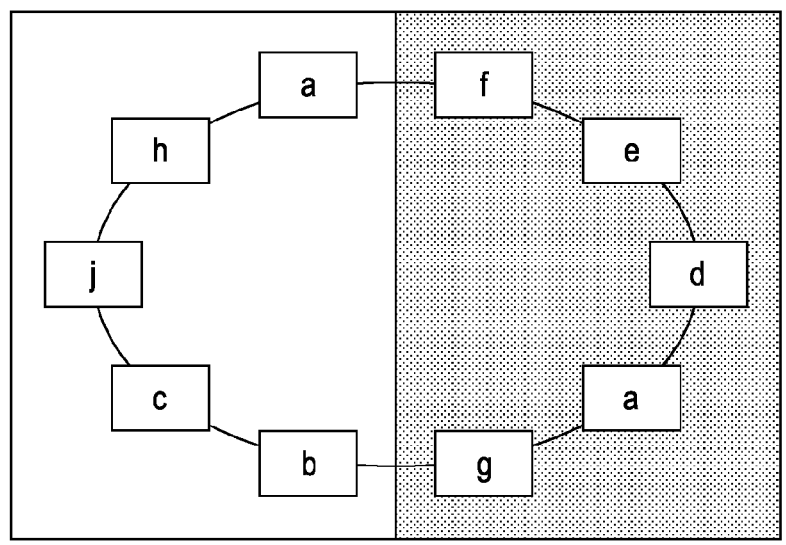

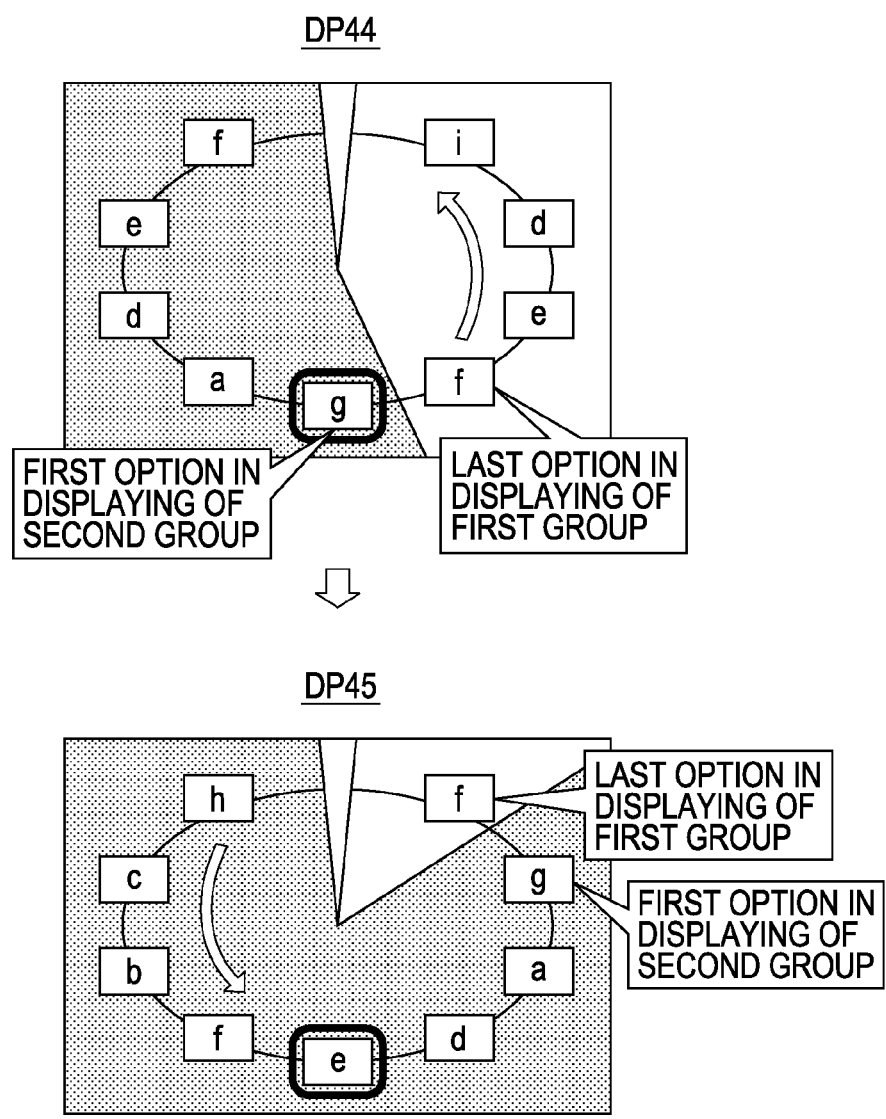

IMAGE DISPLAY METHOD, IMAGE DISPLAY APPARATUS, IMAGE RECORDING APPARATUS, AND IMAGE PICKUP APPARATUS

BACKGROUND OF THE INVENTION

1. Field of the Invention

The present invention relates to an image display method of displaying a plurality of images on a display screen, an image display apparatus, an image recording apparatus, and an image pickup apparatus.

2. Description of the Related Art

With the advancement of digital cameras and an increase in capacity of storages and media, the variety of data storable in a storage medium for storing data, such as a memory card, is increased. For example, a memory card stores data of a still image or movie images taken by a digital camera or of a portable document format (PDF) file captured by a scanner. A universal serial bus (USB) memory stores data of a still image or movie images created from a photograph by use of a personal computer (PC) or of a document created by a PC. In addition to such an increased variety of data storable in a storage, uses of such stored data are also increased.

As a result, a technique for enabling a user to smoothly access many diverse data elements stored in a single storage is required.

One example is a method of enabling a user to access data by use of a wheel device. The use of the wheel device allows quicker manipulation than that occurring when a key is pressed, which is normally used. Because the wheel device allows an item to be selected more quickly, it is often used in data searching or setting. There are some methods of using such a wheel device.

One example method is described in Japanese Patent Laid-Open No. 2004-363707. With this method, a plurality of information strings are displayed in response to rotation of a wheel device, a single focused displayed string is selected, and then a rotational device can be used in operation.

A method of searching a large number of images by use of a wheel device is described in US Patent Application Publication No. 2004155907. With this method, if not all images can be displayed on one screen, the images are three-dimensionally represented such that thumbnails of the images are arranged in a circle while a part of the thumbnails may become invisible toward the back of the screen. This allows a user to also recognize the presence of an image being not displayed.

However, the traditional methods described above are not sufficient as a method of enabling access in today's increasing diversity in data.

For example, for the technique described in the above-mentioned Japanese Patent Laid-Open No. 2004-363707, a plurality of kinds of data are represented as respective circles. That is, to access desired data, it is necessary to search for a circle containing the desired data and select it.

With the invention described in the above-mentioned US Patent Application Publication No. 2004155907, even when the total number of images is large, the images can be represented. However, in that representation, the images are arranged in a single circle, so it requires browsing through the arranged images to search for a target image. Consequently, a problem exists in which it is difficult to reach the target image.

SUMMARY OF THE INVENTION

An embodiment of the present invention provides an image display method of enabling readily searching many diverse data elements stored in a storage medium.

According to an aspect of the present invention, provided is an image display method described below. The image display method includes extracting one or more images from a plurality of images stored in a storage medium, displaying an extracted image grouped in a first group and an extracted image grouped in a second group in regions distinguished from each other, wherein the displaying further includes continuously arranging the image in the first group and the image in the second group and displaying the arranged images, and displaying at least one of the images on the display screen, the at least one of the images belonging to one of the first and second groups, the one of the first and second groups being displayed in a region specified by manipulation by a user.

This method enables a user to search data elements more readily.

Further features of the present invention will become apparent from the following description of exemplary embodiments (with reference to the attached drawings).

BRIEF DESCRIPTION OF THE DRAWINGS

FIGS. 9A and 9B illustrate examples of data selection in the second group and screens displayed when the wheel device is rotated right.

FIG. 10 illustrates an example of an operation occurring when a home key is pressed.

FIGS. 22A and 22B are illustrations describing an example operation of accessing another data group using the wheel device in data searching according to a third embodiment.

DESCRIPTION OF THE EMBODIMENTS

Various exemplary embodiments, features, and aspects of the invention will be described in detail below with reference to the drawings.

First Embodiment

Figure 1:
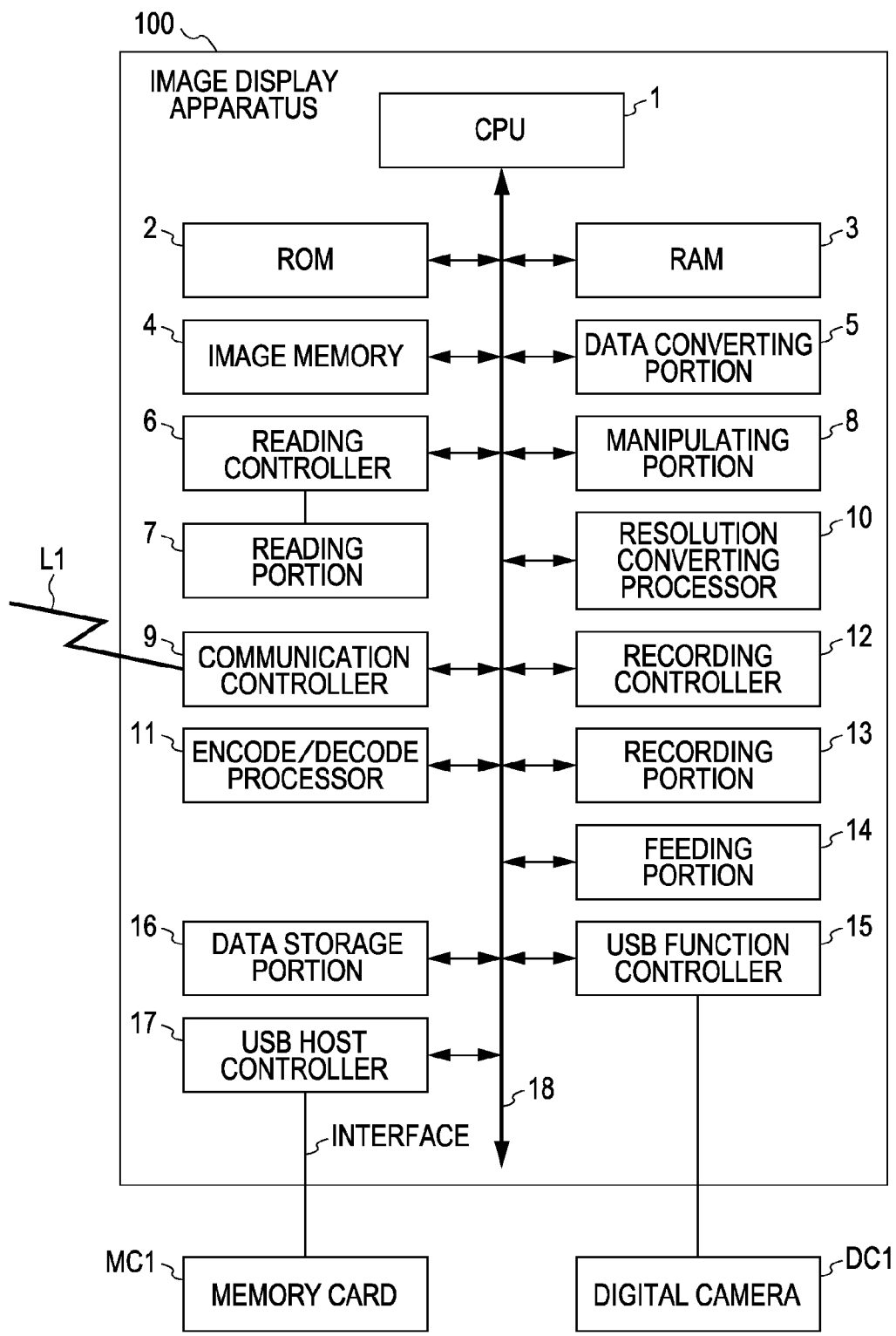
FIG. 1 is a block diagram that illustrates an example general configuration of an image display apparatus.

FIG. 1 is a block diagram that illustrates an example general configuration of an image display apparatus 100.

A central processing unit (CPU) 1 is a system controller and controls the overall image display apparatus 100. A read-only memory (ROM) 2 stores control programs executable by the CPU 1, an embedded operating system (OS) program, and other programs. In the first embodiment, the control programs stored in the ROM 2 perform software control, such as scheduling and task switching, under the control of the embedded OS stored in the ROM 2. A random-access memory (RAM) 3 can be composed of static RAM (SRAM). The RAM 3 stores program control variables and set values entered by a user and management data for the image display apparatus 100 and has a buffer area for various works.

An image memory 4 can be composed of dynamic RAM (DRAM) or other memory and stores image data. A data converting portion 5 converts image data, such as analysis of a page-description language (PDL) and rendering of computer graphics (CG) for character data.

A reading controller 6 is described next. A reading portion 7 optically reads an original using a contact image sensor (CIS) (close coupled image sensor). Then, an image signal in which electric image data is converted is subjected to various image processing, such as binarization and halftoning, through an image processing controller (not shown), and high-definition image data is output. In the first embodiment, the reading controller 6 supports both the sheet reading control system, which reads an original being conveyed, and the book reading control system, which reads an original placed on a platen.

A manipulating portion 8 includes a home key, a navigation key, an enter key, a return key, and other keys. When being manipulated by a user, the manipulating portion 8 inputs an instruction. This instruction from the user is transmitted to the CPU 1. Thus the user can confirm selection of image data to be printed and enter setting data by manipulating the manipulating portion 8. The manipulating portion 8 includes a display screen, in addition to the various keys. On the display screen, an image, various kinds of information to a user, and an operating status of the image display apparatus 100 are displayed. In the present embodiment, the display screen is a liquid crystal display (LCD) by way of example. However, it may also be a light-emitting diode (LED) display or other types of display.

A communication controller 9 includes a modulator/demodulator (MODEM) and a network control unit (NCU). In the first embodiment, the communication controller 9 is connected to an analog communication line (PSTN) L1 and performs communication control under the T30 protocol and line control, such as control of outgoing and incoming calls, on the communication line. A resolution converting processor 10 performs resolution conversion control, such as resolution conversion between millimeter and inch in image data. The resolution converting processor 10 can also scale image data up and down.

An encode/decode processor 11 performs encoding, decoding, and scaling on image data handled by the image display apparatus 100 (e.g., MH, MR, MMR, JBIG, and JPEG). A recording controller 12 performs various kinds of image processing, such as smoothing, correction of recording density, and color correction, on image data to be printed through an image processing controller (not shown). Then, the recording controller 12 coverts the image data into high-definition image data and outputs it to a recording portion 13. By control of the recording portion 13, status information for the recording portion 13 is regularly obtained.

The recording portion 13 is a printing apparatus, such as a laser printer or inkjet printer, and prints color image data or monochrome image data onto a print medium. A feeding portion 14 is a component for holding recording paper for printing. A sheet of paper is fed from the feeding portion 14 by the control from the recording controller 12. In particular, to hold a plurality of types of recording paper in a single apparatus, the feeding portion 14 can be composed of a plurality of feeding portions. In this case, the recording controller 12 controls which feeding portion will feed paper.

A USB function controller 15 performs communication control for a USB interface. The USB function controller 15 performs protocol control according to the USB communication standard, converts data from a USB control task executed by the CPU 1 into packets, and transmits the USB packets to an external information processing terminal. Reversely, the USB function controller 15 converts USB packets from an external information processing terminal into data and transmits the data to the CPU 1.

A data storage portion 16 stores data. Because a region for data backup is not prepared in the DRAM in the image memory 4, in the first embodiment, a data retaining region may be prepared as a data storage portion and may be shared by the image memory 4. The data storage portion 16 can backup data. The data storage portion 16 can retain digital images for use in printing. In the first embodiment, DRAM is used as the data storage portion 16. However, a hard disk and volatile memory can also be used.

A USB host controller 17 is a controller that enables communications using a protocol defined by the USB communication standard. The USB communication standard is a standard that enables interactive data communications at high speed, and in that standard, a plurality of hubs or functions (slaves) can be connected to a single host (master). A memory card MC1 is a data storage medium and can be connected to the image display apparatus 100. In the first embodiment, the memory card MC1 is connected to the USB host controller 17 through an interface. However, they can be connected through other ways. Data of images and other electronic data can access data in the memory card MC1 through the USB host controller 17.

The data storage portion 16 can store various kinds of data. The CPU 1 classifies the data stored in the data storage portion 16 into a plurality of groups on the basis of a predetermined criterion.

In the first embodiment, for USB communications in the recording function, one-to-one connection is used. The above-described components 1 to 6 and 8 to 17 are interconnected through a CPU bus 18. The reading portion 7 reads a document original in accordance with control of the reading controller 6 and stores document data in the data storage portion 16 through the resolution converting processor 10 and/or the data converting portion 5.

In the present embodiment, documents can be searched in response to an instruction input from the manipulating portion 8. Examples of the document data assumed in the first embodiment include, in addition to data of a document obtained from the above-described process, data transferred from the memory card MC1 and data obtained through the communication controller 9. That is, data can be used as the document data as long as it is stored in the data storage portion 16 and has page information.

Figure 2:
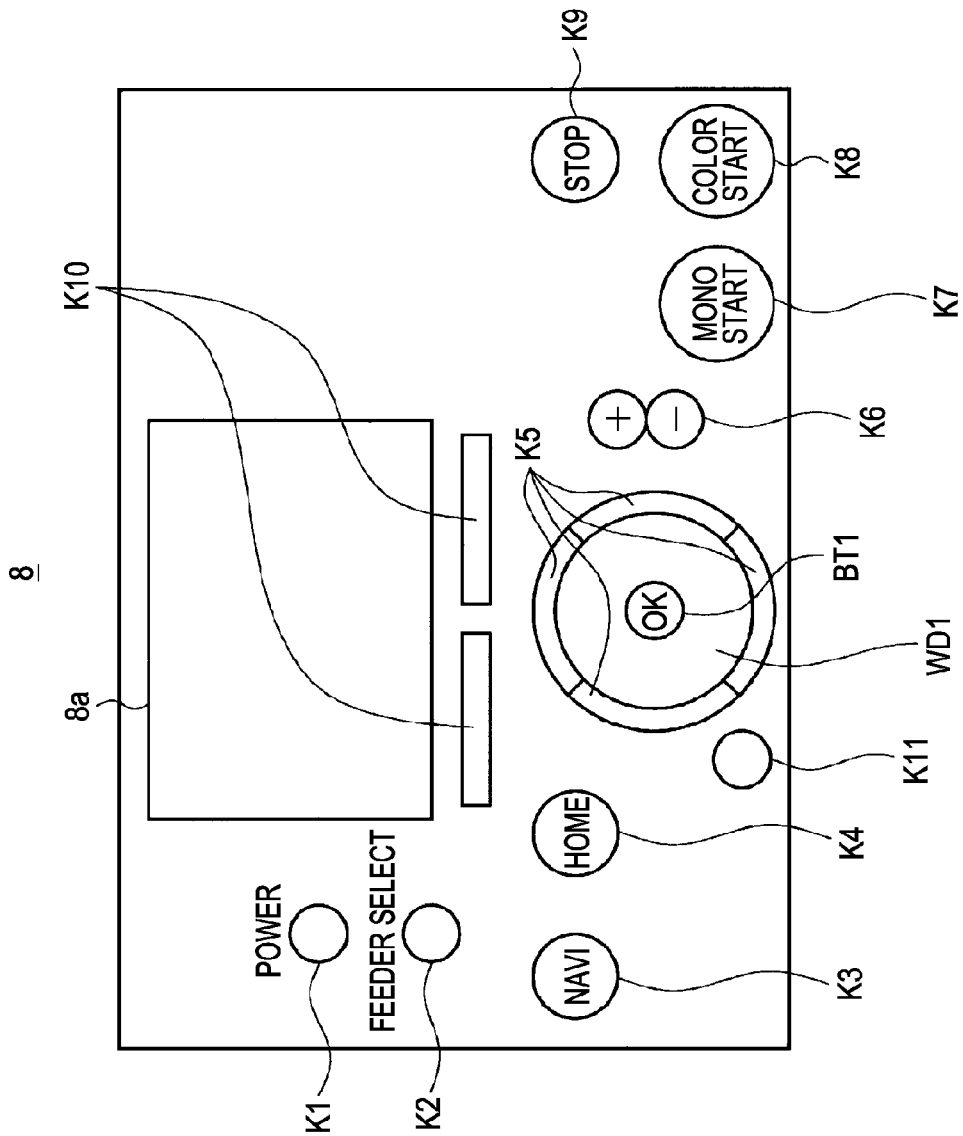
FIG. 2 illustrates a specific example of a manipulating portion of the image display apparatus.

FIG. 2 illustrates a specific example of the manipulating portion 8 of the image display apparatus 100.

A LCD 8a is a display that displays a message, an operation prompt, and various kinds of information thereon.

A power key K1 is a key used for turning the power of the apparatus on or off. A feeder select key K2 is a key used for selecting a feeding portion to be used in the case where the feeding portion 14 is composed of a plurality of feeding portions. A navigation key K3 is a key used for entering the navigation mode, in which the apparatus can be operated simply.

A home key K4 is a key used for entering the home screen, which is the entrance to jobs of copying, scanning, card printing, DVD/CD label printing, settings, and other tasks. A wheel device WD1 is a device used for inputting multiple values by being rotated right (clockwise) or left (counterclockwise). A user can sequentially select images and increase or decrease a numerical value by rotating the wheel device WD1. In the first embodiment, the wheel device WD1 is used for moving the position and rotation of a composite image.

An OK button BT1 is a key used for confirming selection of an item. An up/down/right/left key K5 is used for changing an item changeable by up, down, right, and left movement, such as moving a focus position and changing a numerical value. A plus/minus key K6 is a key used when a user selects from a plurality of options in, for example, a menu or in user registration. The minus sign represents the reverse order, and the plus sign represents the forward order. A monochrome start key K7 is a key used for starting monochrome facsimile transmission, monochrome copying, and other monochrome operations. A color start key K8 is a key used for starting color facsimile transmission, color copying, color photographic printing, and other color operations. A stop key K9 is a key used for stopping facsimile transmission and reception, copying, and other operations.

A function key K10 is a key associated with the screen. The mechanism is that a user presses a button on the basis of an indication that corresponds to the function key K10 and that is displayed on the lower part of the LCD 8a. Because the details of the functions vary from screen to screen, a user can use the multiple functions. A return key K11 is a key pressed to return in the middle of an operation flow or other processes. By the pressing of the return key K11, the present operation can return to the previous operation.

The manipulating portion 8 includes the keys and device described above, so a user can instruct the apparatus by manipulating them. In the first embodiment, the above-described device is used. However, the manipulation portion is not limited to the above-described one as long as it is a unit offering the advantages in this case.

A user can perform printing of data stored in a data storing region in the data storage portion 16 or the memory card MC1 using the recording portion 13 by manipulating the manipulating portion 8. At this time, it is necessary to display a list of stored images and cause a user to select an image to be printed. In particular, in the first embodiment, images to be displayed are stored in the data storage portion 16, and the images are read from the data storage portion 16 and displayed. However, the images may also be stored in the memory card MC1 and read through the interface. Alternatively, the images may also be read from a medium other than a memory card, for example, an external storage medium, such as a USB memory.

Figure 3:
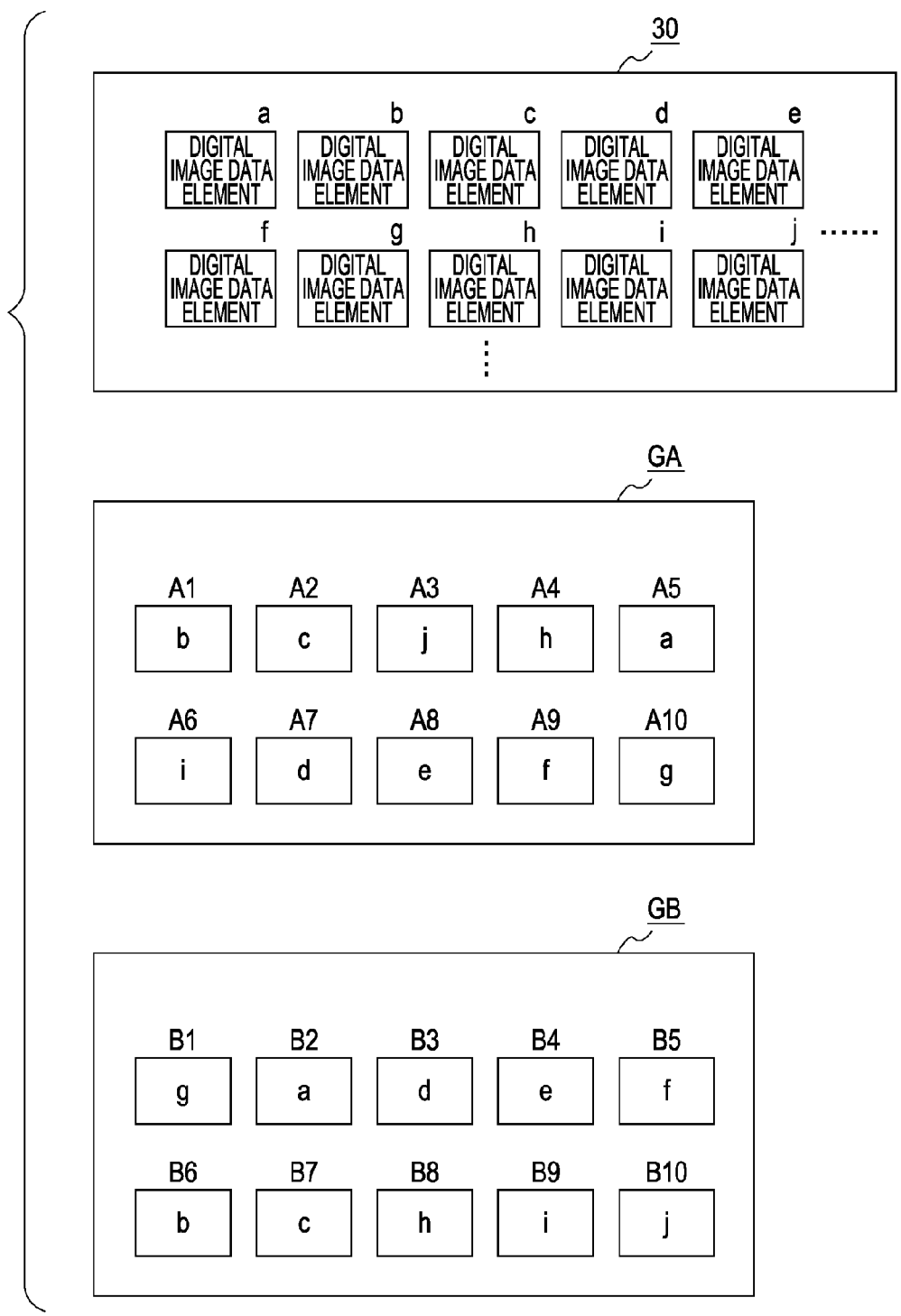
FIG. 3 illustrates a data storage and first and second groups used in the image display apparatus.

FIG. 3 illustrates a data storage 30, a group GA, and a group GB used in the image display apparatus 100.

The data storage 30 can be the data storage portion 16, the memory card MC1, and a digital camera DC1 and include digital image data elements "a," "b," "c," "d," "e," "f," "g," "h," "i," and "j." The image display apparatus 100 recognizes the data storage 30 and displays the digital data elements "a" to "j" to use them in printing or other aims. Here, it is assumed that the data storage 30 also stores digital image data elements other than the digital image data elements "a" to "j." The data storage 30 can also store data of a type different from the digital image data as long as the data is selectable on the LCD 8a.

The group GA illustrated in the drawing is one in which the digital image data elements stored in the data storage 30 are arranged sequentially as a group. A1 to A10 represent the order of the digital image data elements and indicate first to tenth images, respectively. In FIG. 3, the order up to A10 is illustrated, but subsequent digital image data elements A11, A12, . . . grouped into the group GA are present.

The group GB is one in which the digital image data elements stored in the data storage 30 are arranged sequentially as a group, similar to the group GA. The sequence of B1 to B10 represents the order of the digital image data elements, similar to the group GA.

The groups GA and GB are not necessarily groups into which the digital image data elements stored in the data storage 30 are simply divided. That is, digital image data elements that match a condition for the group GA are extracted from the digital image data elements stored in the data storage 30, and the extracted digital image data elements are assigned to the group GA. Likewise, digital image data elements that match a condition for the group GB are extracted and assigned to the group GB. Accordingly, depending on the condition, a digital image data element belonging to the group GA may also belong to the group GB. Here, the digital image data elements belonging to the group GA and those belonging to the group GB overlap each other; however, the orders in the groups GA and GB are different.

Next, the conditions for the groups mentioned above are described more specifically. Each of the digital image data elements is a digital image data element taken by the digital camera DC1 by way of example.

In this case, still images may belong to the group GA, and movie images may belong to the group GB. Alternatively, Joint Photographic Experts Group (JPEG) data may belong to the group GA, and Portable Document Format (PDF) data may belong to the group GB. Further, landscape photographs may belong to the group GA, and people photographs may belong to the group GB. Furthermore, images taken at night may belong to the group GA, and images taken during the daytime may belong to the group GB. In the examples here, not many data elements belong to both the groups GA and GB. However, if the same data elements belong to both the groups GA and GB, there is no problem.

Figure 28:
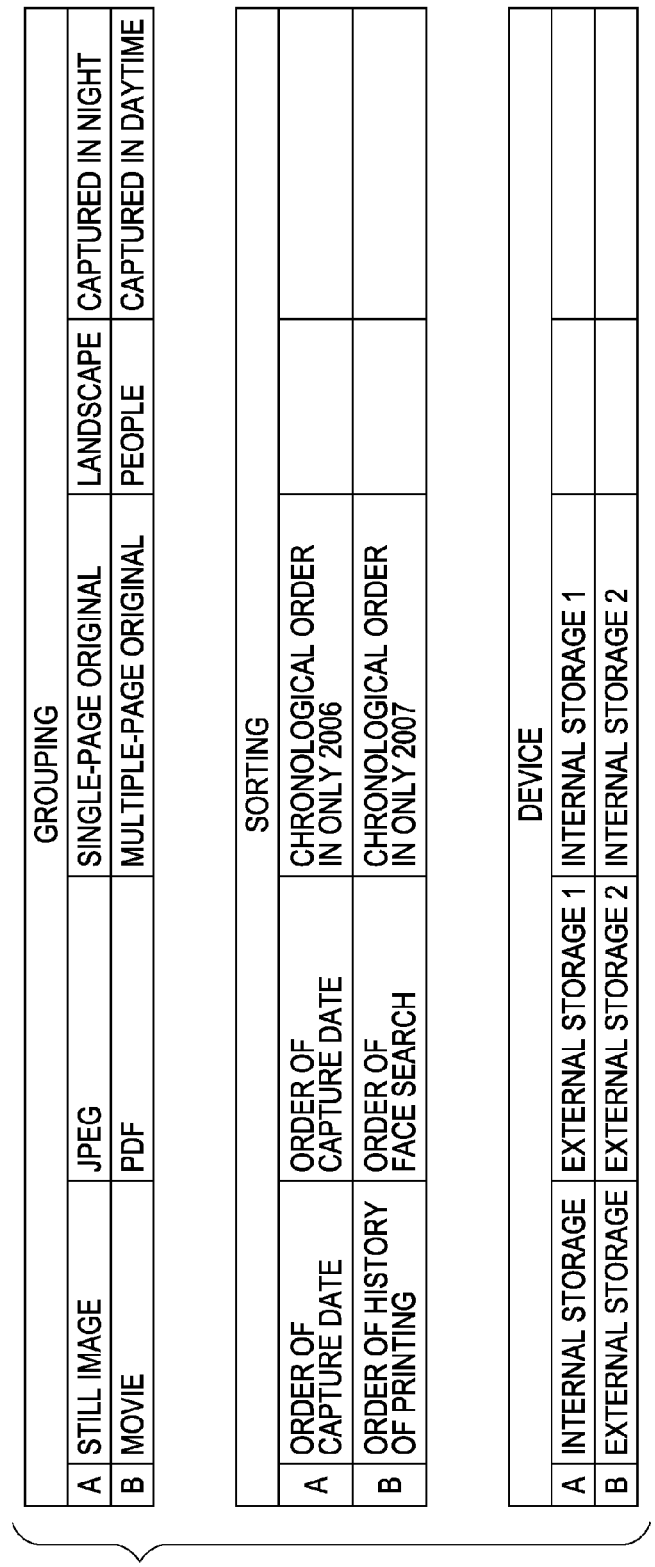
FIG. 28 illustrates specific examples of grouping, sorting, and a device according to first, second, and third embodiments.

FIG. 28 illustrates specific examples of conditions for grouping in the form of a table.

As illustrated, the conditions for grouping may be considered as division by sorting or devices. For example, one group may be produced by a first sorting method, and another group may be produced by another sorting method. Such division by sorting or that by devices will be described below in the second and third embodiments.

Figure 4:
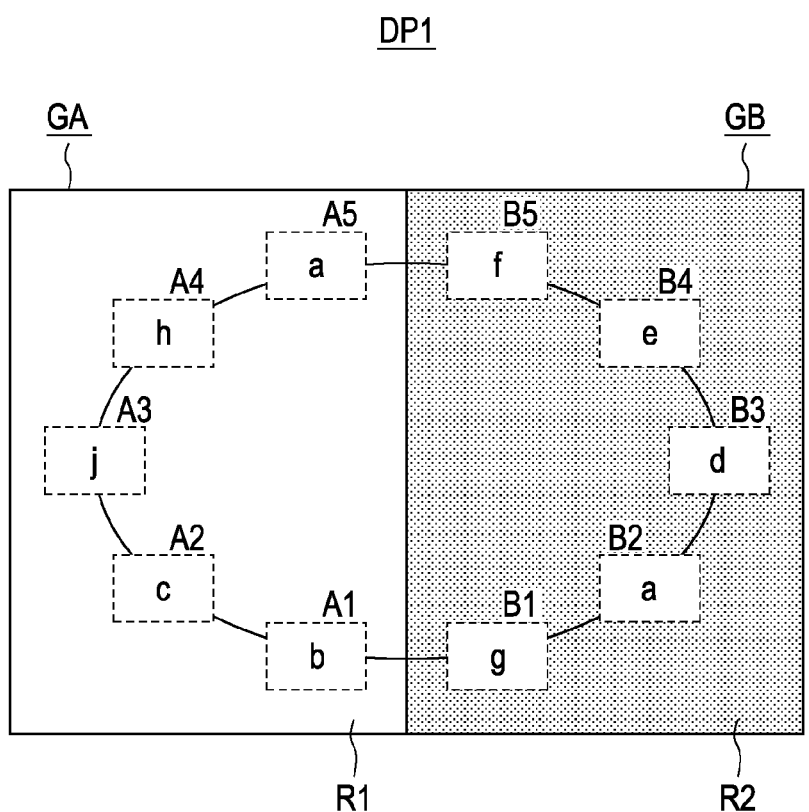
FIG. 4 illustrates an example layout of a standby screen displayed on a liquid crystal display (LCD).

FIG. 4 illustrates an example layout of a standby screen DP1 displayed on the LCD 8a.

The standby screen DP1 has regions R1 and R2. The region R1 has the white background to show that the group GA is displayed. The region R2 has the gray (shaded) background to show that the group GB is displayed.

The data elements in the group GA "b," "c," "j," "h," and "a" are arranged in the left semicircle (on the circumference of the left semicircle). The data elements "g," "a," "d," "e," and "f" are arranged in the right semicircle (on the circumference of the right semicircle). In such a way, the group of images in the group GA is arranged in the region R1, and the group of images in the group GB is arranged in the region R2. The groups of images of these two groups GA and GB are continuously displayed in a circular shape in this way on the standby screen DP1. In particular, in FIG. 4, the groups of images are arranged in the left semicircle and the right semicircle, respectively, such that the images arranged in the semicircles in total form a circle.

Figure 5:
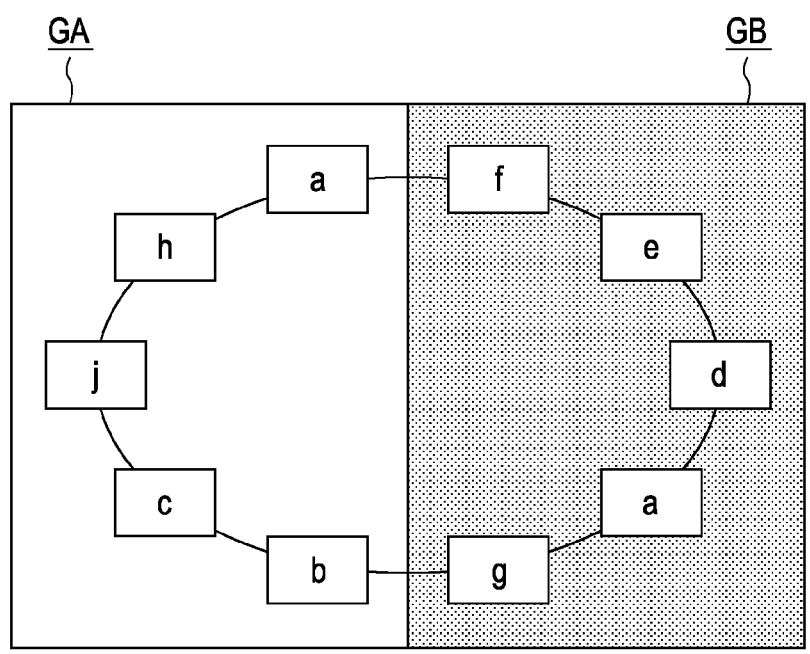
FIG. 5 illustrates an example layout of the standby screen displayed on the LCD.

FIG. 5 illustrates an example layout of the standby screen DP1 displayed on the LCD 8a.

In the same data storage 30, the order in the group GA and the order in the group GB are characteristic. Because of this characteristic, the same data element may be assigned to both the groups GA and GB. For example, the digital image data element "a" is assigned to both the groups GA and GB. As a result of arranging the digital image data elements according to the rule for the group GA and the digital image data elements according to the rule for the group GB, the digital image data element "a" happens to be contained in the group GA and it also happens to be contained in the group GB. However, the place of the digital image data element "a" is different.

Such a standby screen is displayed, and a user is prompted to select an image. To select the image, the user performs main manipulation using the wheel device WD1 of the manipulating portion 8.

Figure 6:
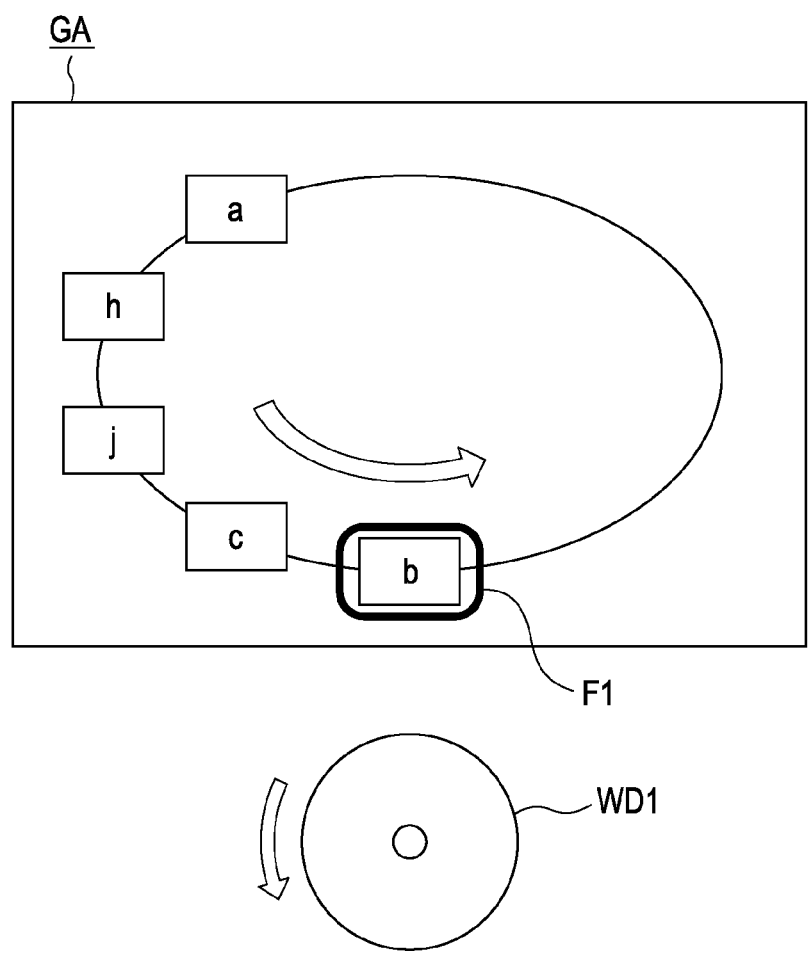
FIG. 6 illustrates a screen displayed when the first group is accessed to search the first group in a state where the standby screen illustrated in FIG. 5 is displayed.

FIG. 6 illustrates a screen DP2 displayed when the group GA is accessed to search the group GA in a state where the standby screen DP1 illustrated in FIG. 5 is displayed. When the wheel device WD1 is rotated left on the standby screen DP1 illustrated in FIG. 5, the currently displayed screen is switched to this screen DP2. On this screen, data elements in the group GA can be searched in a state where the group GB is not displayed. That is, a user can search data elements as if to pull a data element out of the left semicircle using the wheel device WD1. A focus F1 is used to indicate a currently selected image to the user. In the state illustrated in FIG. 6, the focus F1 is placed on the digital image data element "b" being selected. At this time, to show that the displayed screen is for use in selection in searching the group GA, the background is white.

Figure 7A:
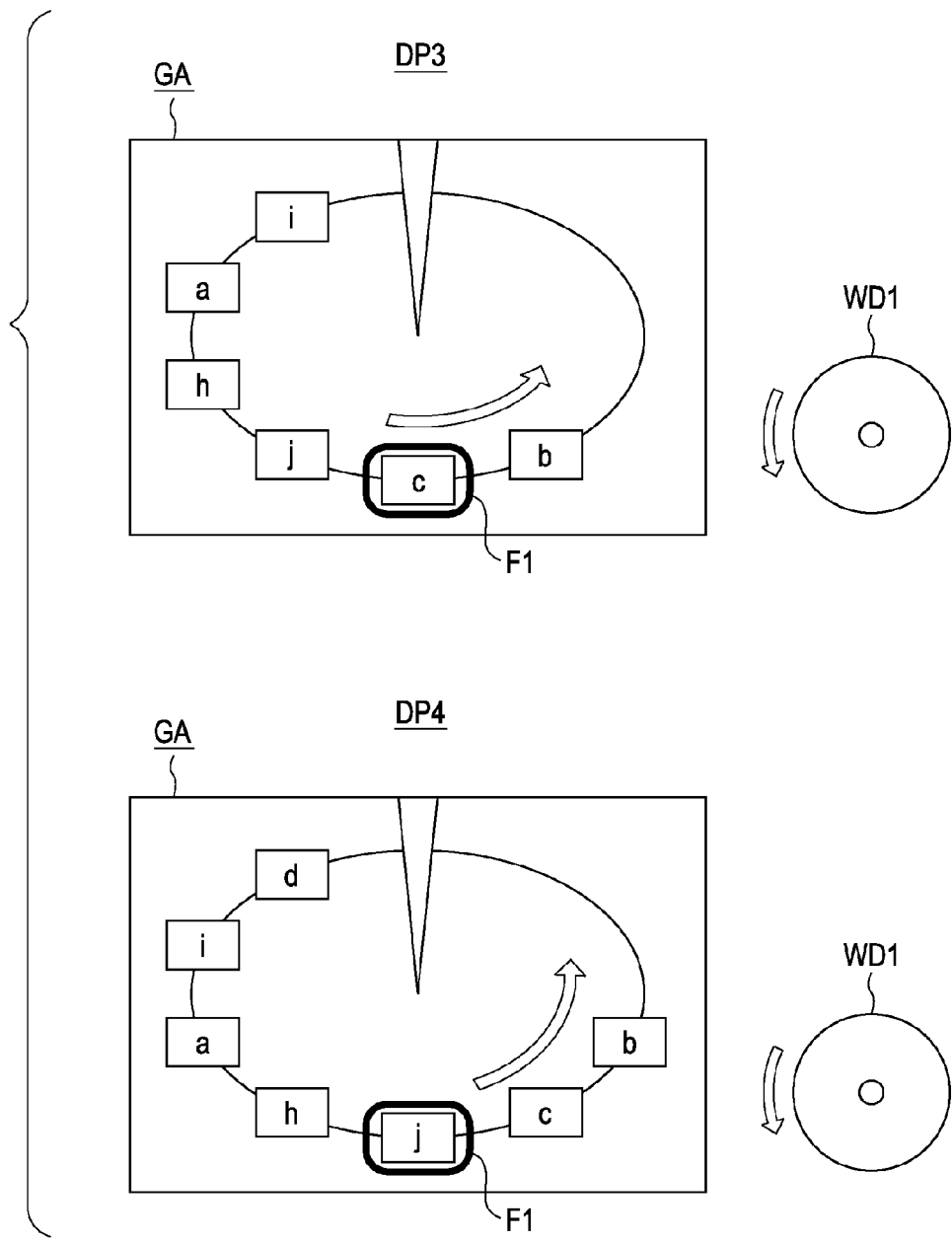
FIGS. 7A to 7C illustrate examples of data selection in the first group and screens displayed when a wheel device is rotated left.
Figure 7B:
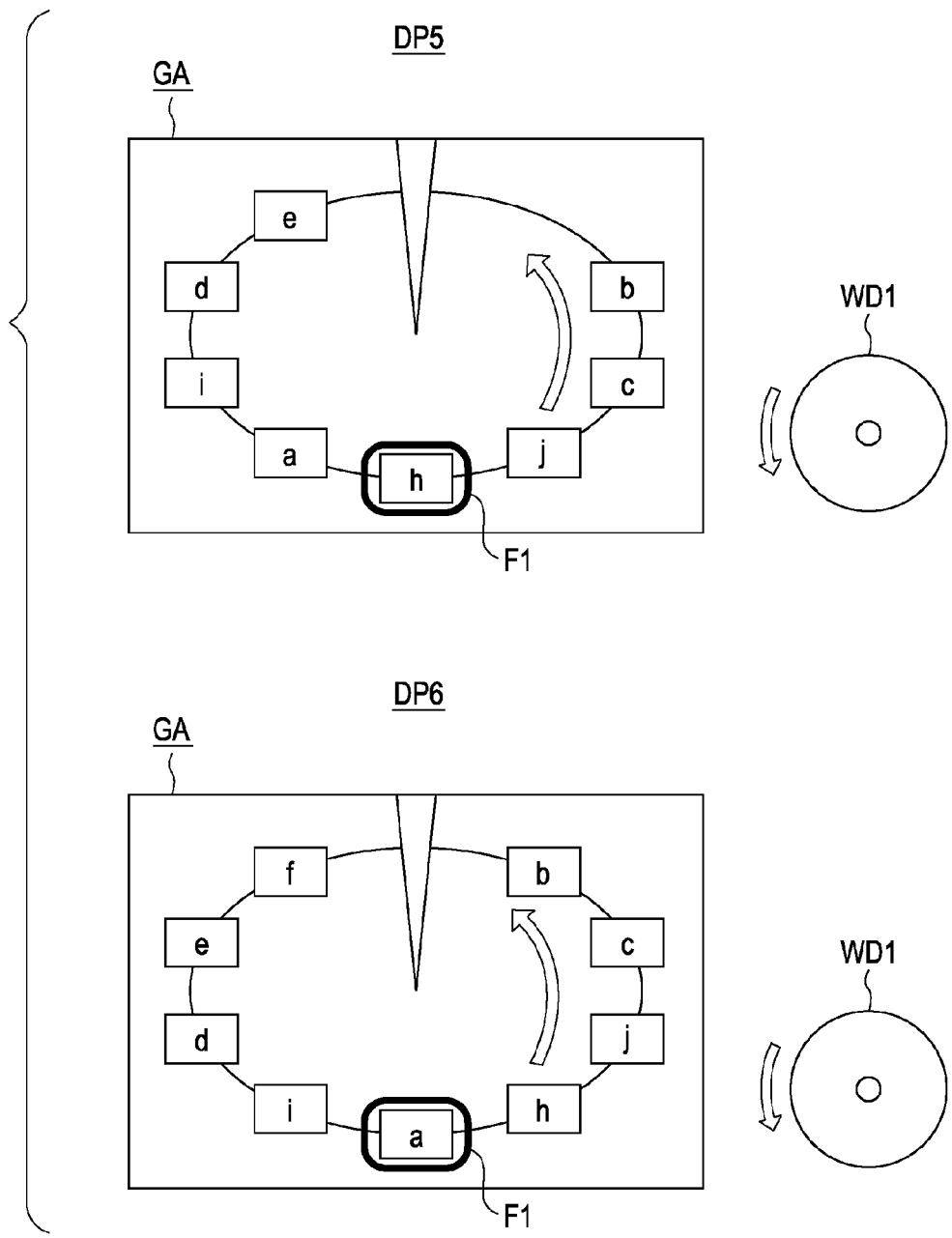
Figure 7C:
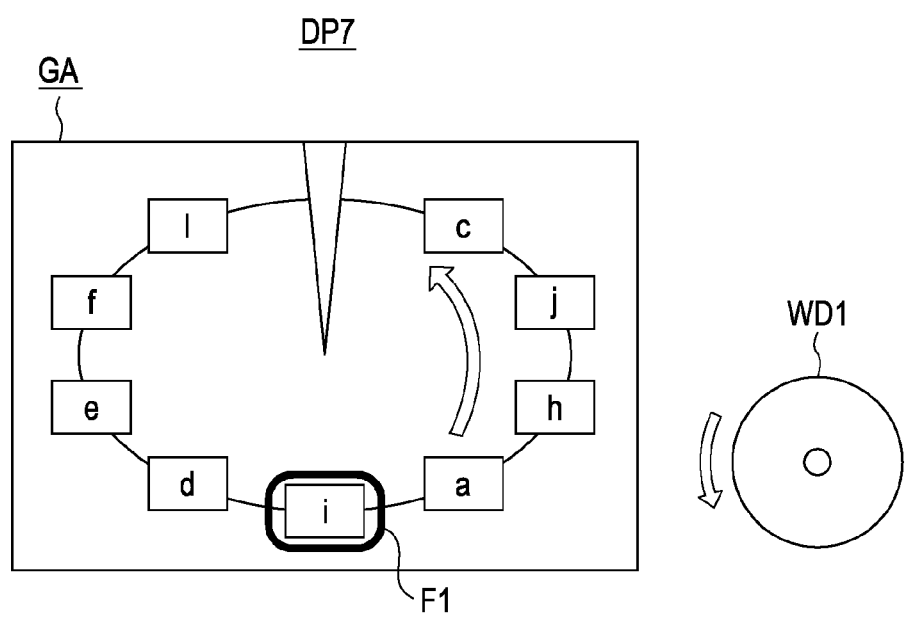

FIGS. 7A, 7B, and 7C illustrate examples of data selection in the group GA and illustrate screens displayed when the wheel device WD1 is rotated left.

When the wheel device WD1 is further rotated left from the state illustrated in FIG. 6, as shown in a screen DP3, the digital image data element on which the focus F1 is placed is changed from "b" to "c." When the wheel device WD1 is further rotated, as shown in screens DP4, DP5, DP6, and DP7, the digital image data element on which the focus F1 is placed is sequentially changed to "j," "h," "a," and "i."

That is, the user can select a digital image data element in the order in the group GA illustrated in FIG. 3 by rotating the wheel device WD1. With this method, a group of data elements is also moved in a circular path by left (counterclockwise) rotation of the wheel device WD1 (the position of the focus F1 is not changed). Accordingly, the user can intuitively perform manipulation of the wheel device WD1 and manipulation on the displayed screen. After the wheel device WD1 is rotated left (counterclockwise), as described above, when the wheel device WD1 is rotated right (clockwise), the screen is returned. For example, when the wheel device WD1 is rotated right in the state of the screen DP7, the screen is changed in order of the screens DP6, DP5, and DP4, and digital image data elements are also moved rightward (clockwise).

In such a way, a user can intuitively select a digital image data element from the group GA from the standby screen DP1 illustrated in FIG. 5 by use of the wheel device WD1.

Figure 8:
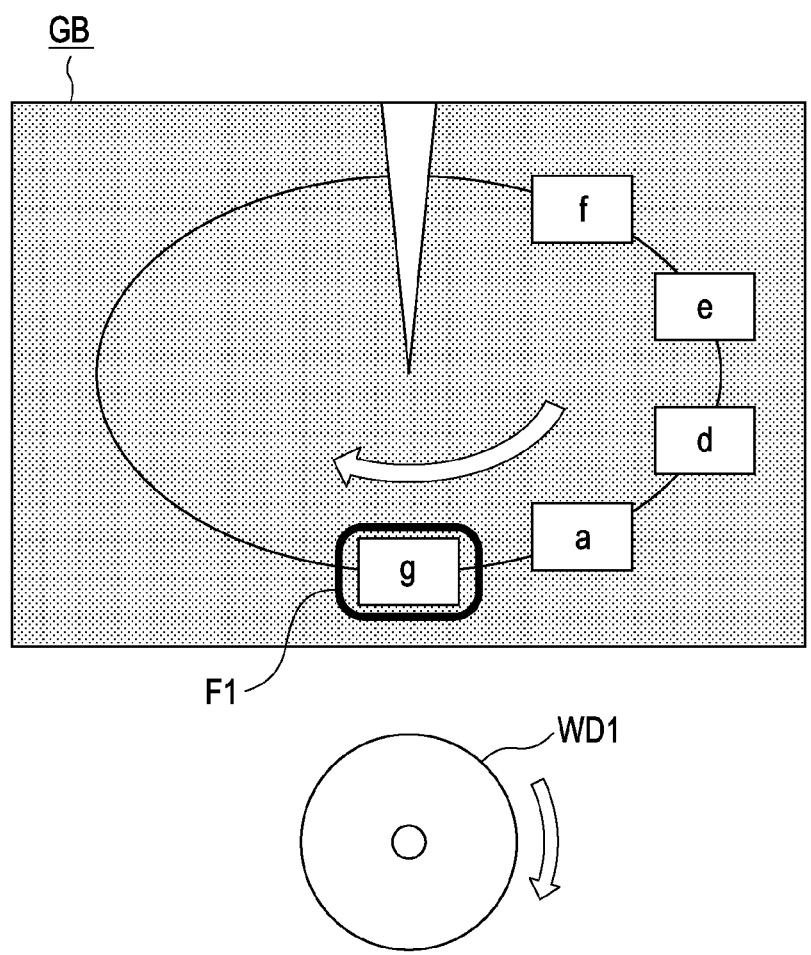
FIG. 8 illustrates a screen displayed when the second group is accessed to search the second group in a state where the standby screen illustrated in FIG. 5 is displayed.

FIG. 8 illustrates a screen DP12 displayed when the group GB is accessed to search the group GB in a state where the standby screen DP1 illustrated in FIG. 5 is displayed.

When the wheel device WD1 is rotated right in the state illustrated in FIG. 5, data elements in the group GB can be searched. That is, a user can search data elements as if to pull a data element out of the right semicircle using the wheel device WD1. The screen appearing when the group GB is rotated right by use of the wheel device WD1 on the standby screen DP1 illustrated in FIG. 5, which is the initial screen for use in selecting an image, is the screen DP12.

The screen DP12 is the initial screen for use in selecting an image. It is the screen appearing when the group GB is rotated right by use of the wheel device WD1 in the standby screen DP1 illustrated in FIG. 5. The digital image data elements "g," "a," "d," "e," and "f" are the data elements arranged as the group GB. The focus F1 is the focus to indicate a currently selected image to the user. In the screen DP12, the focus F1 is placed on the digital image data element "g" being selected. At this time, to show that the displayed screen is for use in selection in searching the group GB, the background is gray.

Figure 9B:
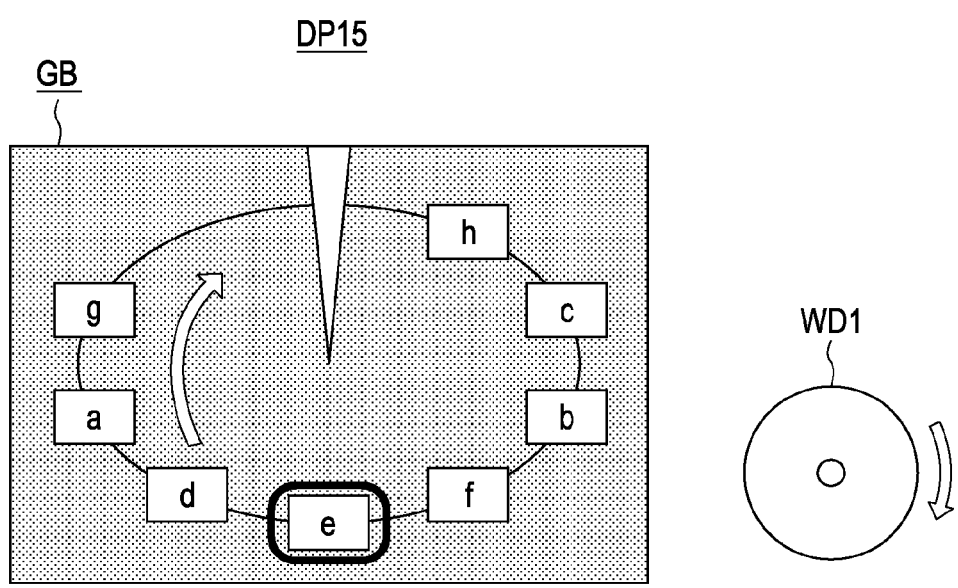

FIG. 8 also illustrates the state in which the wheel device WD1 is rotated right. The movement occurring when the wheel device WD1 is rotated right in this way is illustrated in FIGS. 9A and 9B. FIGS. 9A and 9B illustrate examples of data selection in the group GB and illustrate screens displayed when the wheel device WD1 is rotated right.

When the wheel device WD1 is further rotated right from the state illustrated in the screen DP12, the digital image data element on which the focus F1 is placed is changed from "g" to "a," as shown in a screen DP13. When the wheel device WD1 is further rotated, as shown in screens DP14 and DP15, the digital image data element on which the focus F1 is placed is sequentially changed to "d" and "e." Thus the user can select a digital image data element in the order in the group GB illustrated in FIG. 3. When the wheel device WD1 is rotated right, the group of data elements is also moved rightward in a circular path. Accordingly, the user can intuitively perform manipulation of the wheel device WD1 and manipulation on the displayed screen. After the wheel device WD1 is rotated right, as described above, when the wheel device WD1 is rotated left, the screen is returned. For example, when the wheel device WD1 is rotated left in the state of the screen DP15, the screen is displayed from the screens DP15, DP14, to DP13, and digital image data elements are moved leftward (counterclockwise). In such a way, the user can intuitively select a digital image data element from the group GB from the standby screen DP1 illustrated in FIG. 5 using the wheel device WD1.

FIG. 10 illustrates an example of an operation occurring when the home key K4 is pressed.

A screen DP21 is a screen for use in searching data elements in the group GA. In this case, when the home key K4, which is illustrated in FIG. 2, is pressed, the screen returns to the standby screen DP1. The standby screen DP1 is the initial screen for use in selecting an image, as illustrated in FIG. 5, and a screen that displays the data elements of both the group GA and the group GB. With this method, even when data elements of one group are searched, data elements of the other group can be accessed for searching.

Figure 11:
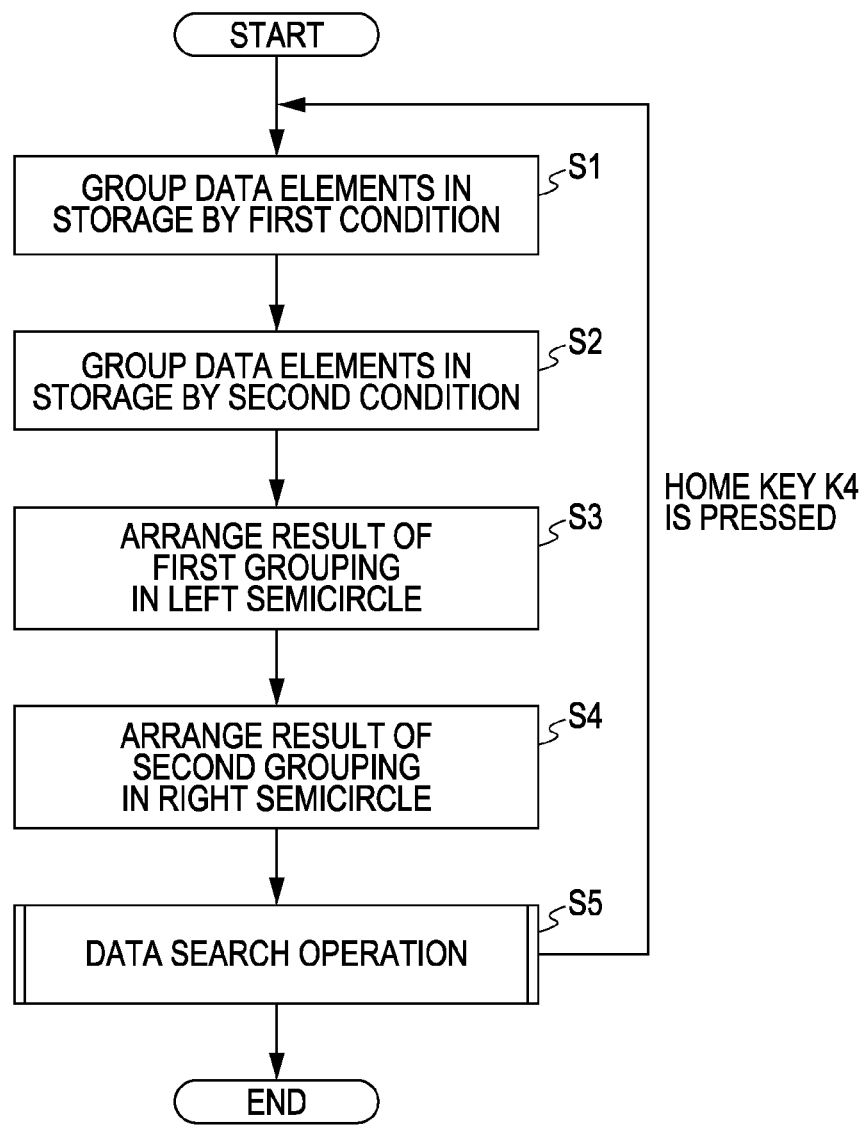
FIG. 11 is a flowchart of an example operation shown in FIGS. 5 to 10.

FIG. 11 is a flowchart of an example operation shown in FIGS. 5 to 10. This flowchart shows, in the apparatus, an operation of displaying data elements stored in the data storage 30 and selecting a data element.

First, in step S1, the data elements stored in the data storage 30 are grouped by a first grouping condition. For example, the grouping produces the group GA illustrated in FIG. 4. Then, in step S2, the data elements stored in the data storage 30 are grouped by a second grouping condition. For example, the grouping produces the group GB illustrated in FIG. 4. In such a way, the data elements stored in the data storage 30 are subjected to grouping into two groups. As previously described, in this grouping process, the data elements are not simply divided into first and second groups. A data element matching the first condition and that matching the second condition are extracted from the data elements stored in the data storage 30. Thus, depending on the grouping condition, two groups may have the same data element, or may have no overlapping data element. Here, before step S1 in the flowchart illustrated in FIG. 11 is performed, a user sets the conditions by manipulating the manipulating portion 8. The details of the setting process by the user will be described below with reference to FIG. 15. The grouping conditions may be predetermined without being set by the user.

Then, in step S3, the data elements of the result of the grouping in step S1 are arranged in a left semicircle in sequence using the display method illustrated in FIG. 5. In step S4, the data elements of the result of the grouping in step S2 are arranged in a right semicircle in sequence using the display method illustrated in FIG. 5.

As described above, the results of two grouping operations are arranged and displayed in the circumference of a single circle. An example of this displaying is illustrated in FIGS. 4 and 5. In step S5, a user can search data elements by manipulating the wheel device WD1 while looking at the screens displayed in steps S3 and S4. The details of this process will be described below with reference to FIG. 12. When the home key K4 is pressed in step S5, flow returns to step S1. That is, the screen returns from that for use in searching to the standby screen again, so the user can select a group. If the order of images sorted in each of steps S1 and S2 is retained, a group can be selected on the standby screen displayed when flow returns to step S3 upon the pressing of the home key K4 in step S5.

Figure 12:
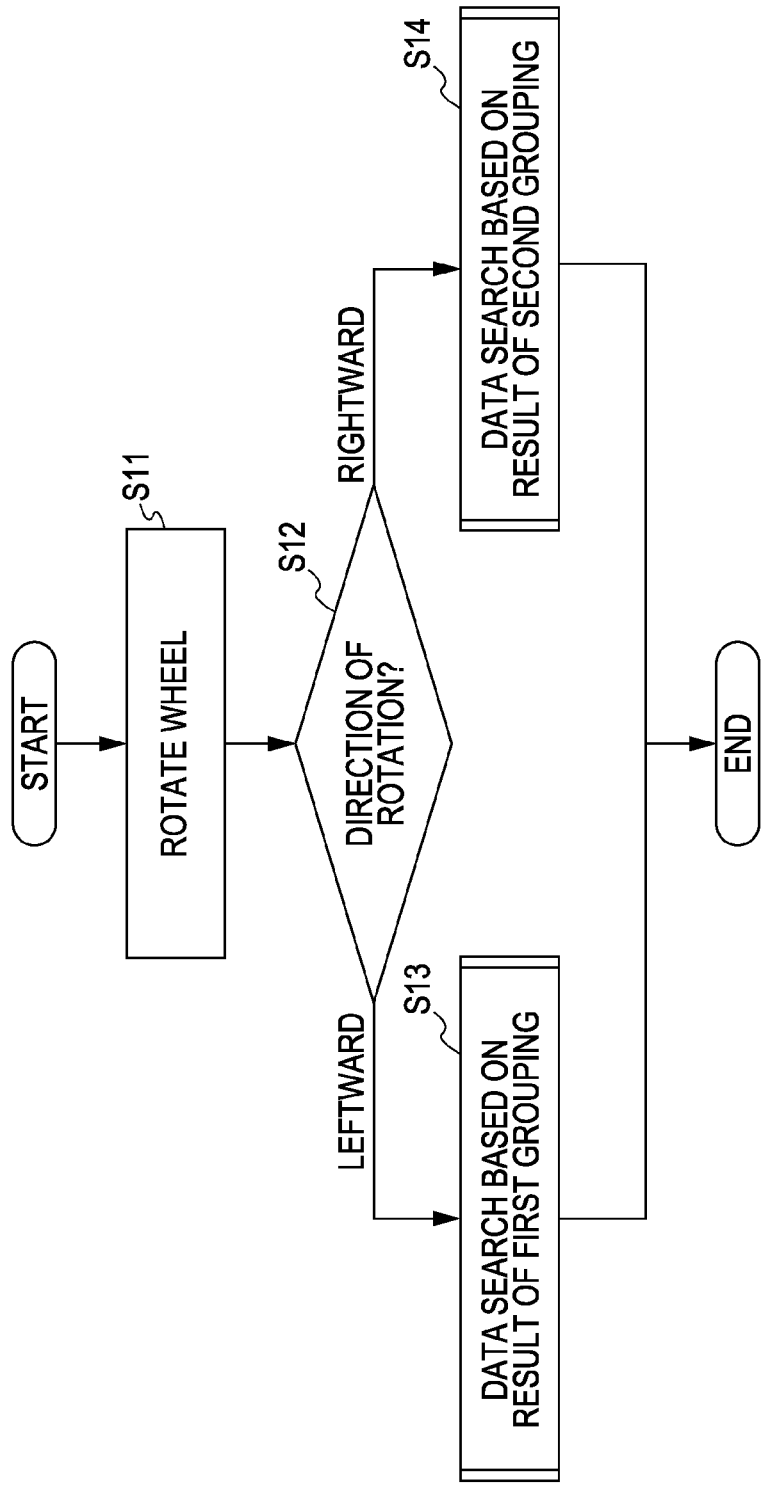
FIG. 12 is a flowchart of an example operation from an initial screen according to a first embodiment.

FIG. 12 is a flowchart of an example operation from the initial screen according to the first embodiment. This flowchart shows an operation of selecting a data element on a screen in which two groups of data elements are arranged in the circumference of a single circle, as illustrated in FIG. 5, by a user using the wheel device WD1.

First, in step S11, rotation of the wheel device WD1 performed by the user is recognized. In step S12, the direction of the rotation of the wheel device WD1 is determined. If it is determined that the wheel device WD1 is rotated left (counterclockwise), flow proceeds to step S13. In step S13, data elements can be searched on the basis of the result of the first grouping.

The details of an operation of searching data elements of the result of the first grouping will be described below with reference to FIG. 13. If, in step S12, it is determined that the wheel device WD1 is rotated right (clockwise), flow proceeds to step S14. In step S14, data elements can be searched on the basis of the result of the second grouping. The details of an operation of searching data elements of the result of the second grouping will be described below with reference to FIG. 14.

Figure 13:
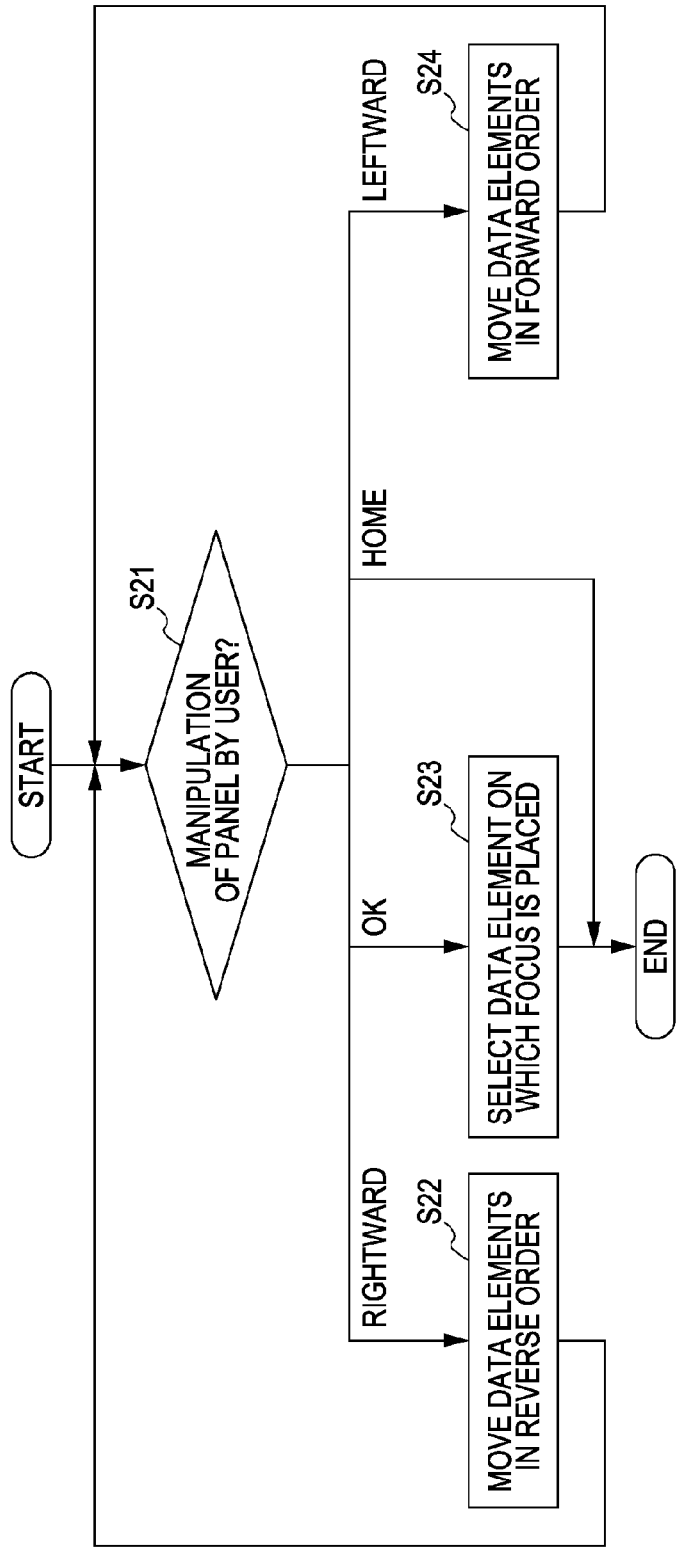
FIG. 13 is a flowchart of an example operation of searching the first group.

FIG. 13 is a flowchart of an example operation of searching data elements in the first group GA.

This flowchart shows an operation of searching the first group, as illustrated in FIGS. 6 and 7, when the wheel device WD1 is rotated left, as illustrated in FIG. 12.

In step S21, user manipulation of the panel is recognized. If the wheel device WD1 is rotated right, flow proceeds to step S22, where the data elements are moved in reverse order to how the data elements were arranged in the group. When the data element at the front is reached in displaying in that reverse order, the data element at the backend is displayed. If, in step S21, the wheel device WD1 is rotated left, flow proceeds to step S24, where the data elements are moved in forward order in which the data elements were arranged. When the data element at the backend is reached in displaying in that forward order, the data element at the front is displayed again.

The flowchart illustrated in FIG. 13 shows the operation executed when the wheel device WD1 is rotated left in FIG. 12. That is, when it is rotated left in this way, the data elements are moved in forward order. Accordingly, a user can select a data element merely by continuing rotating the wheel device WD1 in the same direction from the standby screen DP1 illustrated in FIG. 5.

If, in step S21, the OK button BT1 is pressed, flow proceeds to step S23, where it is determined that the data element on which the focus F1 is placed is selected. Then, flow is completed. If, in step S21, the home key K4 is pressed, flow is completed, and the initial standby screen DP1 is displayed again, as described in step S5. That is, the screen returns to the standby screen DP1 from that for data searching, and the user can select a data element.

Figure 14:
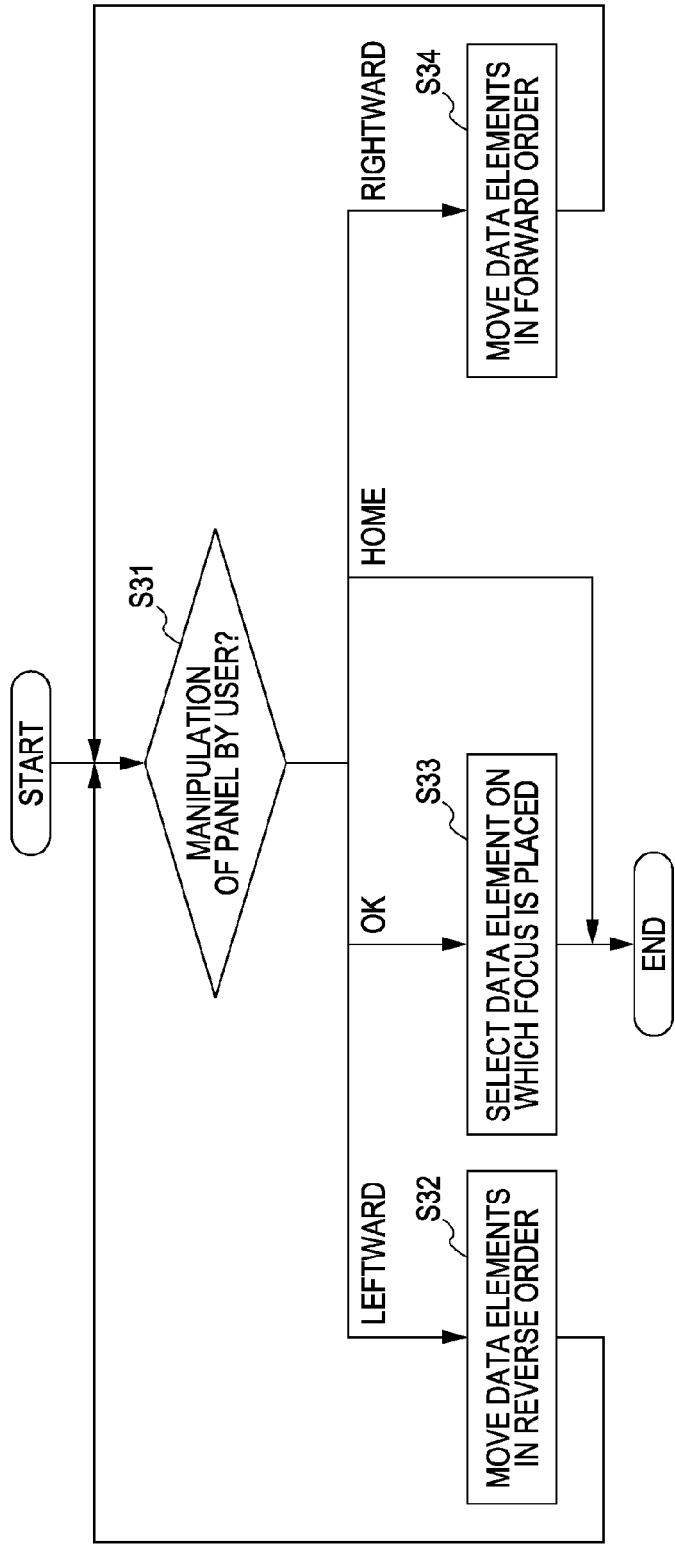
FIG. 14 is a flowchart of an example of an operation of searching the second group.

FIG. 14 is a flowchart of an example operation of searching data elements in the second group GB.

The flowchart illustrated in FIG. 14 shows the operation of searching data elements in the second group, as illustrated in FIGS. 8 and 9, when the wheel device WD1 is rotated right in FIG. 12.

In step S31, user manipulation of the panel is recognized. If the wheel device WD1 is rotated left, flow proceeds to step S32, where the data elements are moved in reverse order to how the data elements were arranged in the group. When the data element at the front is reached in displaying in that reverse order, the data element at the backend is displayed. If, in step S31, the wheel device WD1 is rotated right, flow proceeds to step S34, where the data elements are moved in forward order in which the data elements were arranged.

When the data element at the backend is reached in displaying in that forward order, the data element at the front is displayed.

As illustrated in the flowchart illustrated in FIG. 14, the user can select a data element merely by continuing rotating the wheel device WD1 in the same direction from the standby screen DP1 illustrated in FIG. 5, as in the flowchart of FIG. 13.

If, in step S31, the OK button BT1 is pressed, flow proceeds to step S33, where it is determined that the data element on which the focus F1 is placed is selected. Then, flow is completed. If, in step S31, the home key K4 is pressed, flow is completed, and the initial standby screen DP1 is displayed again, as described in step S5. That is, the screen returns to the standby screen DP1 from that for data searching, and the user can select a data element.

In such a manner, the user can select a data element from the group of data elements of either one of the two groups merely by manipulating through the wheel device WD1 while the two groups are displayed, as illustrated in FIG. 5. The user can also select a data element by continuing the manipulation.

As illustrated in FIGS. 12 to 14, the state where a data element is selected can be shifted to the initial screen used for selecting a group by the pressing of the home key K4. In the above-described embodiment, the state where a data element is selected is changed to the screen used for selecting a group by the pressing of the home key K4. The user may take action to the apparatus by using a key performing similar manipulation to the pressing of the home key K4 or touching a touch panel, in place of the pressing of the home key K4.

Figure 15:
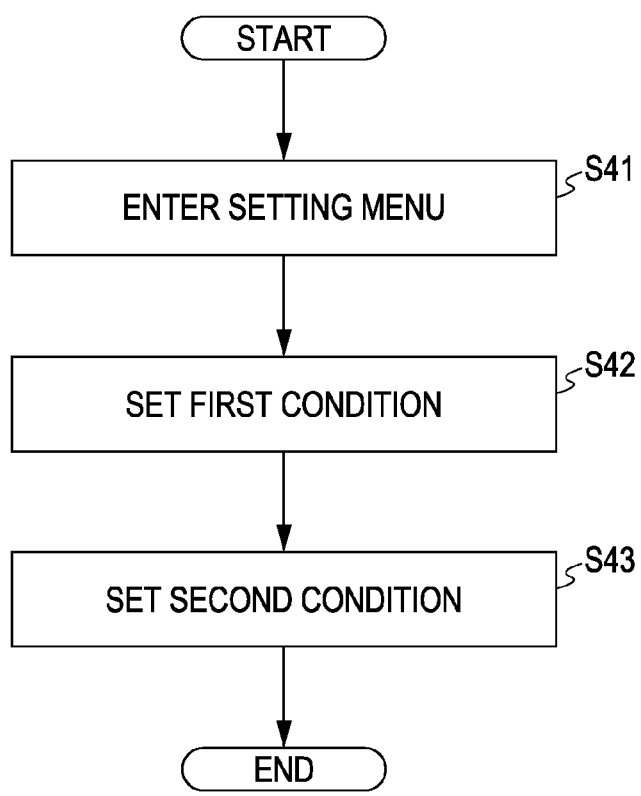
FIG. 15 illustrates an example of a process for setting a group.

FIG. 15 illustrates an example of a process for setting a group.

As illustrated in FIG. 3, the two groups GA and GB are ordered. The example illustrated in FIG. 15 is an example of specifying conditions for the groups. The details of the conditions will be described further with reference to FIG. 28. There are various examples of a condition for grouping. With the method illustrated in FIG. 15, a user can select a condition from among a plurality of options, and two groups can be set by the condition selected by the user.

In step S41, the setting menu is entered. In the first embodiment, the setting menu can be called by the pressing of the navigation key K3. In step S42, the first group is set. In the first embodiment, the user can select a condition from among a plurality of options using the wheel device WD1 and confirms the selection using the OK button BT1. In step S43, the second group is set. The setting method is the same as in step S42.

Through such a group setting process, the two groups GA and GB can be displayed, as illustrated in FIG. 5.

With the above-described process, the user can readily search many diverse data elements stored in the data storage 30 (data storage portion 16) by using the wheel device WD1 and utilizing displaying, as described in the above-described embodiment.

As described above, in the first embodiment, the data elements stored in the data storage 30 can be subjected to grouping, and two groups can be displayed. In the first embodiment, they are grouped by a condition related to the type of data. However, as illustrated in FIG. 28, they may be grouped by a sorting condition or a condition for each device.

One example of such grouping by sorting will be described in the second embodiment below. One example of such grouping by devices will be described in the third embodiment below. Thus grouping other than that described in the first embodiment may be used as long as data elements are arranged in two groups. Specifically, as illustrated in FIG. 28, examples of the sorting condition include a combination of order of capture date and order of history of printing and a combination of order of capture date and order of face search. Sorting by the "order of face search" can be, for example, searching for an image in which the face of a particular person was taken and sorting found images in order of the highest number of faces. Alternatively, it may be sorting simply in order of the highest number of faces found in each images, not that for a particular person.

In the case where data elements are grouped by devices, they can be divided into those in an internal storage of the apparatus and those in an external storage. That is, the data elements stored in the internal storage are those stored in the data storage portion 16, and the data elements stored in the external storage are those stored in, for example, the memory card MC1. Another example of the external storage can be a USB memory.

Second Embodiment

The second embodiment of the present invention is an embodiment in which the grouping illustrated in FIG. 5 is carried out by sorting. Here, an embodiment is described in which, when the state returns to the standby screen DP1 in the course of searching data elements, an operation other than using the home key K4 illustrated in FIG. 10 is carried out. The concept of displaying data on a screen in the present embodiment is substantially the same as that in the first embodiment illustrated in FIGS. 1 to 10.

Figure 16:
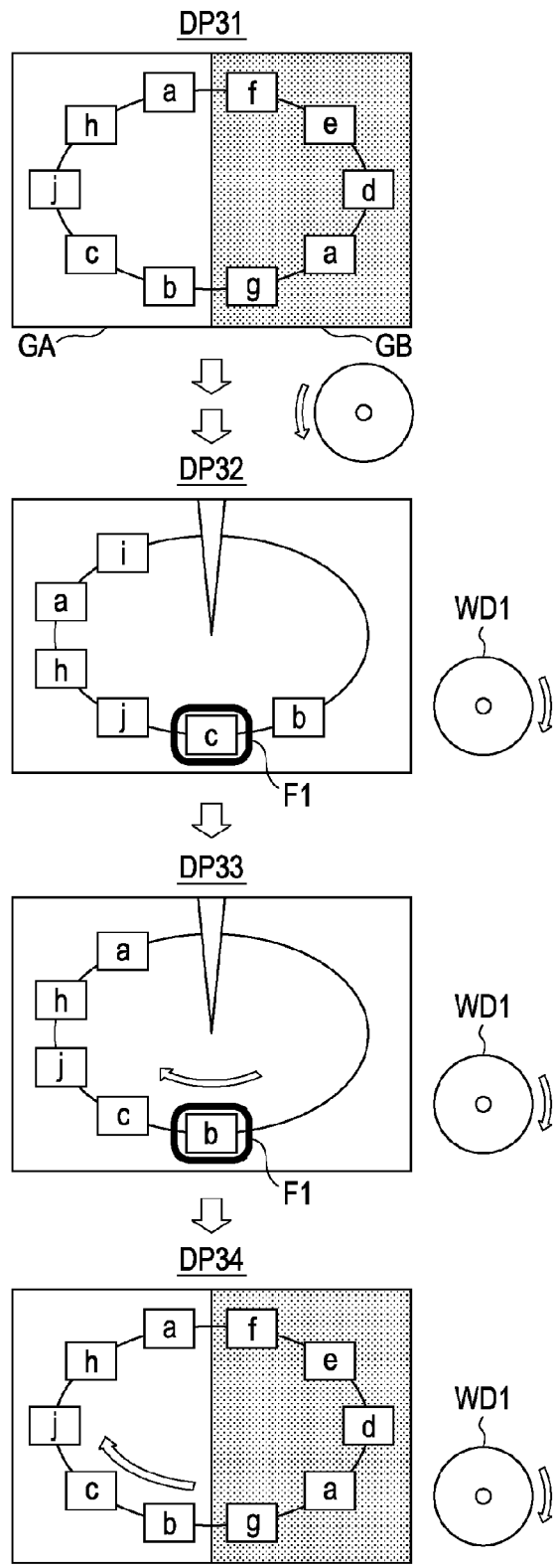
FIG. 16 illustrates an example process for returning to the standby screen without the use of the home key.

FIG. 16 illustrates how to return to the standby screen DP1 without the use of the home key K4. How to return to the standby screen DP1 using the home key K4 is described in FIG. 10. Here, the state returns to the standby screen DP1 illustrated in FIG. 5 using the wheel device WD1 alone.

A standby screen DP31 is a standby screen for use in data selection for selecting a group. By manipulation of the wheel device WD1, the state is changed to the screens for use in data selection illustrated in FIGS. 6 to 9. Here, as one example, a screen DP32 is a screen for use in data selection occurring appearing when the wheel device WD1 is rotated left (counterclockwise) by two steps on the standby screen DP31.

When the wheel device WD1 is rotated inversely right (clockwise) from here, data elements are displayed in reverse order. An example behavior in this case will be described using the screens DP32, DP33, and DP34.

When the wheel device WD1 is rotated right by one step in the state of the screen DP32, the screen DP33 appears. The data element on which the focus F1 is placed in the screen DP33 is "b," which is positioned at the front of the group GA. That is, the state returns to a screen initially appearing when the wheel device WD1 is rotated left in the screen DP31. When the wheel device WD1 is further rotated right, an initial screen for use in data selection at which a user can select a group of data elements illustrated in the standby screen DP31 appears, as illustrated in the screen DP34.

As described above, in the second embodiment, the state can return to the initial screen for data selection at which a user can select a group of data elements by manipulation of the wheel device WD1 alone, in addition to the use of the home key K4, as described in the first embodiment. In the foregoing description, the state returns to the initial screen by left rotation of the wheel device WD1 in the standby screen DP31 and then right rotation of it. However, the screen for searching also returns to the standby screen DP31 by right rotation of the wheel device WD1 in the standby screen DP31 and then left rotation of it, similar to the above-described case. The details of this operation will be described below with reference to the flowcharts illustrated in FIGS. 19 and 20.

Figure 17:
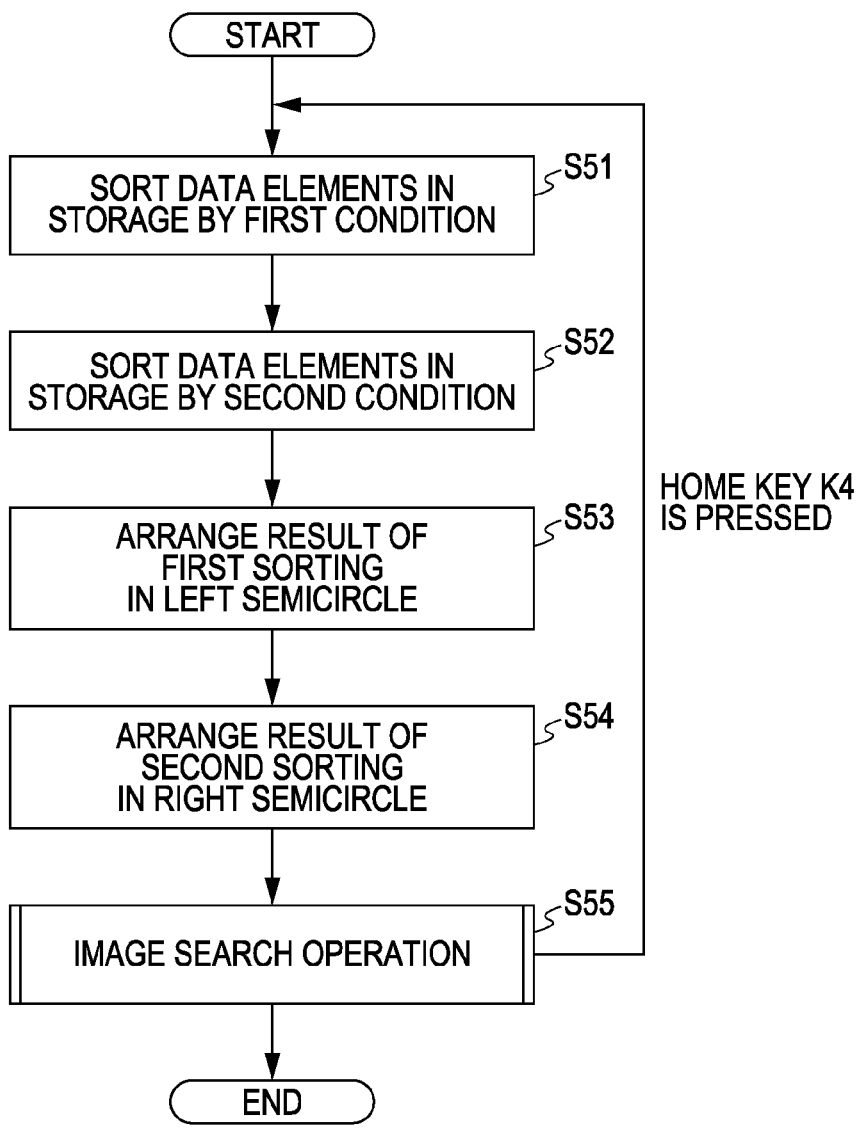
FIG. 17 is a flowchart of an example operation illustrated in FIGS. 5 to 10 and 16.

FIG. 17 is a flowchart of an example operation illustrated in FIGS. 5 to 10 and 16. Here, it is noted that grouping is performed by sorting. Here, in particular, grouping is performed by sorting using order of capture date and order of history of printing, as illustrated in FIG. 28.

The flowchart illustrated in FIG. 17 is a flowchart that shows an operation of displaying data elements stored in the data storage 30 described with reference to FIG. 4 and selecting a data element according to the second embodiment.

In step S51, data elements stored in the data storage 30 are subjected to sorting by a first sorting condition. In step S52, the data elements stored in the data storage 30 are sorted by a second sorting condition. In such a way, the data elements stored in the data storage 30 are subjected to sorting by two sorting conditions and grouping into groups. In this process, data elements stored in the same data storage 30 are subjected to grouping through sorting operations by two respective conditions. Accordingly, depending on the sorting condition, two groups may have the same data element, or may have no overlapping data element.

In step S53, the data elements of the result of the grouping through sorting in step S51 are arranged in a left semicircle in sequence using the display method illustrated in FIG. 5. In step S54, the data elements of the result of the grouping through sorting in step S52 are arranged in a right semicircle in sequence using the display method illustrated in FIG. 5. In such a way, the results of two grouping operations are arranged and displayed in the circumference of a single circle. Finally, flow proceeds to step S55, where a user can search data elements by manipulating the wheel device WD1 while looking at the screens displayed in steps S53 and S54. The details of the processing in step S55 are substantially the same as those shown in the flowchart of FIG. 12, which is previously described. When the user presses the home key K4 in step S55, flow returns to step S51. That is, the screen for use in searching returns to the standby screen DP31 again, so the user can select a group. If the order of images sorted in each of steps S51 and S52 is retained, a group can be selected on the standby screen displayed when flow returns to step S53 upon the pressing of the home key K4 in step S55.

Figure 18:
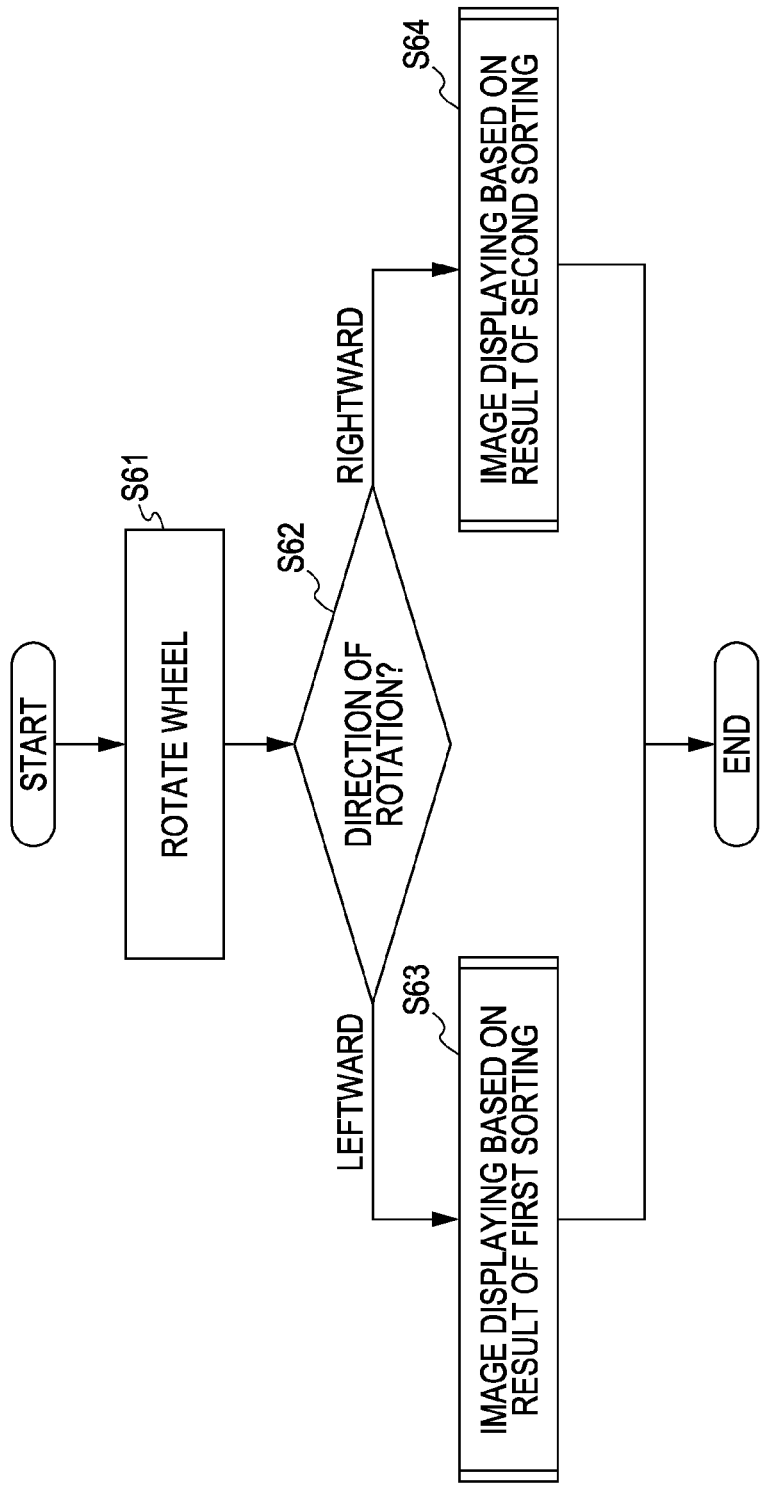
FIG. 18 is a flowchart of an operation of selecting a data element according to a second embodiment.

Next, an operation of selecting a data element will be described. FIG. 18 is a flowchart of an example operation from the initial screen according to the second embodiment. This flowchart shows an operation of selecting a data element on a screen in which two groups of data elements are arranged in the circumference of a single circle, as illustrated in FIG. 5, by a user using the wheel device WD1.

Figure 19:
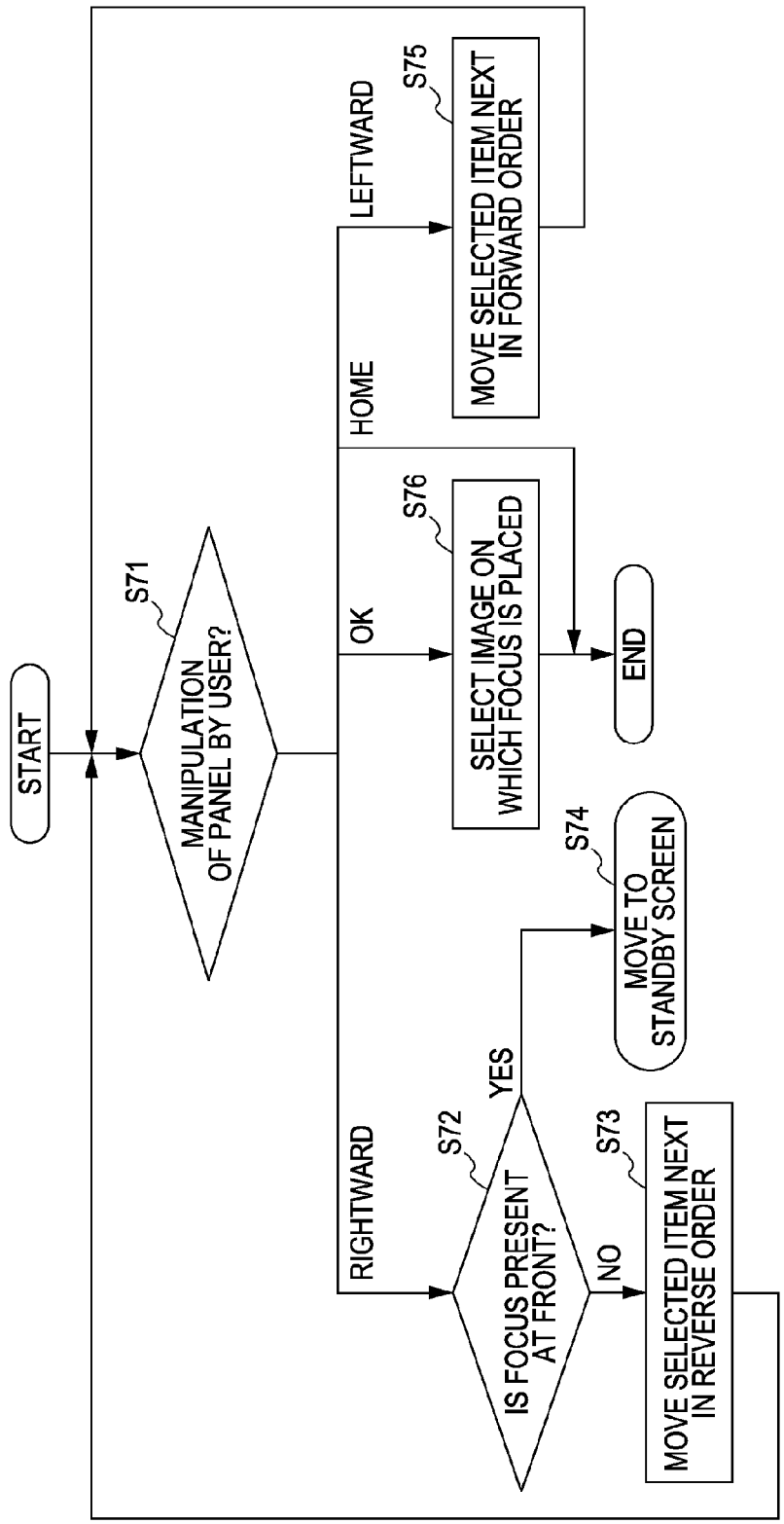
FIG. 19 is a flowchart of an operation of searching data elements of the result of first sorting.
Figure 20:
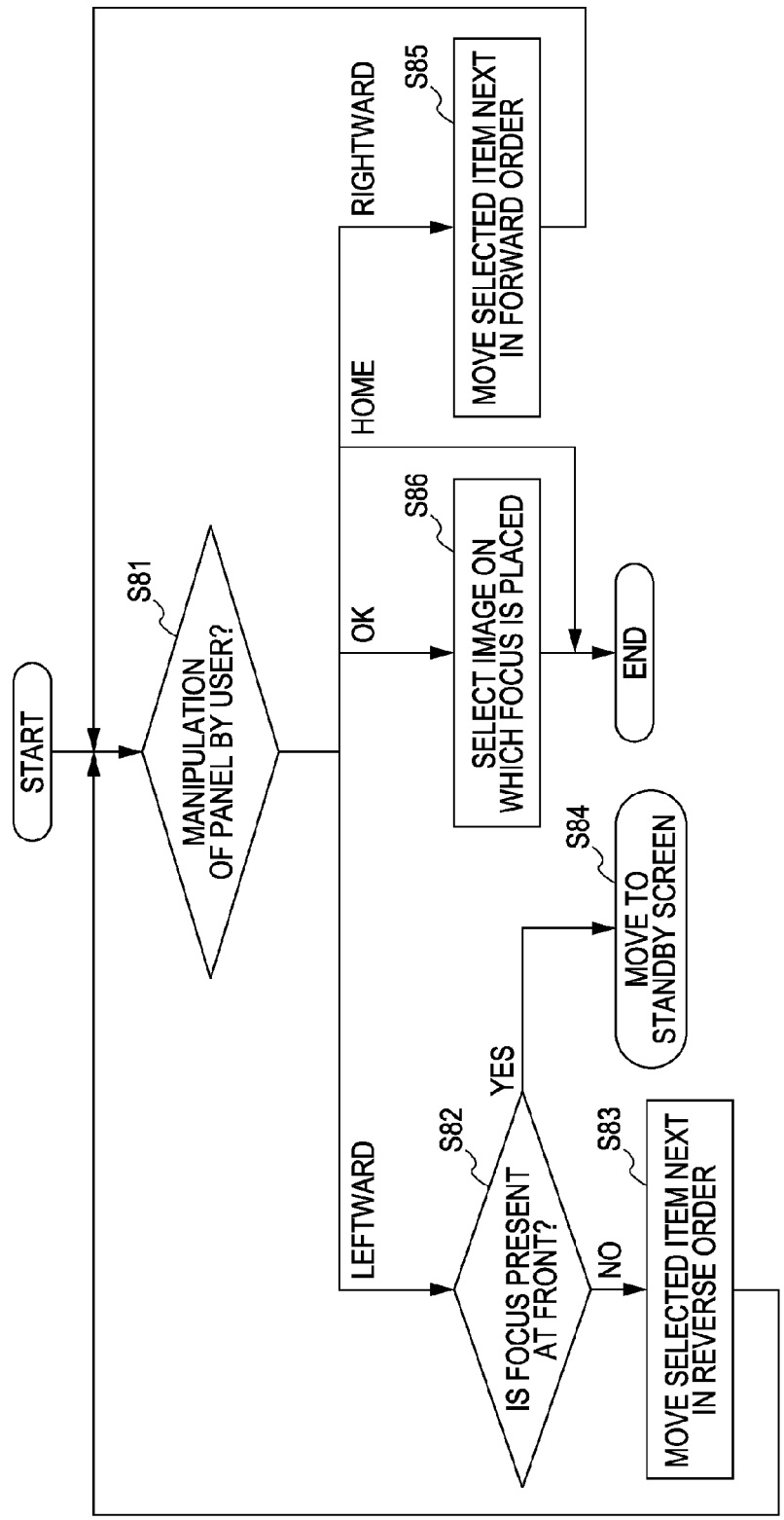
FIG. 20 is a flowchart of an operation of searching data elements of the result of second sorting.

In step S61, rotation of the wheel device WD1 performed by the user is recognized. In step S62, the direction of the rotation of the wheel device WD1 is determined. If it is determined that the wheel device WD1 is rotated left (counterclockwise), flow proceeds to step S63. In step S63, data elements can be displayed and searched on the basis of the result of the first sorting. The details of an operation of searching the result of the first sorting are shown in the flowchart of FIG. 19. If, in step S62, it is determined that the wheel device WD1 is rotated right (clockwise), flow proceeds to step S64, where digital image data elements can be displayed and searched on the basis of the result of the second sorting. The details of an operation of searching the result of the second sorting are shown in the flowchart of FIG. 20.

FIG. 19 is a flowchart of an example operation of searching data elements of the result of the first sorting. This flowchart shows an operation of searching the first group, as illustrated in FIGS. 6 and 7, when the wheel device WD1 is rotated left, as illustrated in FIG. 18.

In step S71, user manipulation of the panel is recognized. If the wheel device WD1 is rotated right (clockwise), flow proceeds to step S72, where it is determined which data element the present focus is placed on. If, in step S72, it is determined that the focus is placed on the front of the data elements, flow proceeds to step S74, where the standby screen DP31 is displayed. This "standby screen" is a standby screen for use in data selection at which the user can select a group of data elements, as illustrate FIG. 5, and is the screen DP34, which is illustrated in FIG. 16.

In such a way, the state can be changed to the standby screen DP31 for use in selecting a group of data elements by use of the wheel device WD1 alone without use of the home key K4. If, in step S72, it is determined that the focus F1 is not present at the front of the sorting, flow proceeds to step S73, where the selected item is moved next in reverse order. If, in step S71, it is determined that the wheel device WD1 is rotated left (counterclockwise), flow proceeds to step S75, where the data elements are moved in forward order in which the data elements were arranged.

The operation illustrated in the flowchart of FIG. 19 is the operation executed when the wheel device WD1 is rotated left (counterclockwise) in FIG. 12. When it is rotated left (counterclockwise) in this way, the data elements are moved in forward order. Accordingly, a user can select a data element merely by continuing rotating the wheel device WD1 in the same direction from the standby screen DP31. Inversely, when it is rotated right from there, the data elements can be moved reversely. When they are moved until the data element at the front is displayed, the state returns to the standby screen DP31. When it is further rotated right, the other data group can be displayed.

If, in step S71, the OK button BT1 is pressed, flow proceeds to step S76, where it is determined that the data element with the focus F1 illustrated in FIG. 6 is selected. Then, flow is completed. If, in step S71, the home key K4 is pressed, flow is completed, and the initial standby screen DP31 is displayed, as described in step S55. That is, the screen returns to the standby screen from that for data searching, and the user can select a data element.

FIG. 20 is a flowchart of an example operation of searching data elements of the result of the second sorting.

This flowchart shows an operation of searching the second group, as illustrated in FIGS. 8 and 9, when the wheel device WD1 is rotated right, as illustrated in FIG. 18.

First, in step S81, user manipulation of the panel is recognized. If the wheel device WD1 is rotated left (counterclockwise), flow proceeds to step S82, where it is determined which data element the present focus is placed on. If, in step S82, it is determined that the focus is placed on the front of the data elements, flow proceeds to step S84, where the standby screen DP31 is displayed. This "standby screen" is a standby screen for use in data selection at which the user can select a group of data elements, as illustrate FIG. 5, and is the screen DP34, which is illustrated in FIG. 16. With such a movement, the state can be changed to the standby screen DP31 for use in selecting a group of data elements by use of the wheel device WD1 alone without use of the home key K4.

If, in step S82, it is determined that the focus F1 is not present at the front of the sorting, flow proceeds to step S83, where the selected item in the sorting is moved next in reverse order. If, in step S81, it is determined that the wheel device WD1 is rotated right (clockwise), flow proceeds to step S85, where the data elements are moved in forward order in which the data elements were arranged.

The operation illustrated in the flowchart of FIG. 20 is the operation executed when the wheel device WD1 is rotated right (clockwise) in FIG. 12. When it is rotated right (clockwise) in this way, the data elements are moved in forward order. Accordingly, a user can select a data element merely by continuing rotating the wheel device WD1 in the same direction from the standby screen DP31. Inversely, when it is rotated left from there, the data elements can be viewed reversely, and, if they are moved until the data element at the front is displayed, the state returns to the standby screen DP31. When it is further rotated left, the other data group can be displayed.

If, in step S81, the OK button BT1 is pressed, flow proceeds to step S86, where it is determined that the data element on which the focus F1 is placed is selected. Then, flow is completed. If, in step S81, the home key K4 is pressed, flow is completed, and the initial standby screen DP31 is displayed, as described in step S55. That is, the screen returns to the standby screen from that for data searching, and the user can select a data element.

The second embodiment can be highly advantageous for the case where only high-order data elements of data elements belonging to two groups are necessary to a user and the high-order data elements in each of the groups produced by sorting are required to be viewed.

Figure 21:
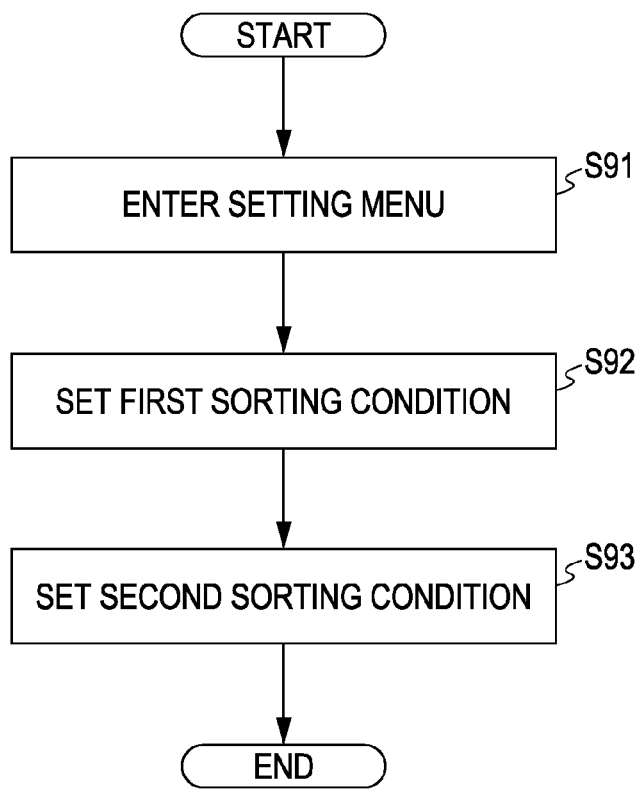
FIG. 21 is a flowchart of an example operation of setting sorting.

FIG. 21 is a flowchart of an example operation of setting sorting.

In the second embodiment, as illustrated in FIG. 4, the data elements stored in the data storage 30 are ordered in each of the groups GA and GB. FIG. 21 illustrates an example operation of setting a condition for the sorting. Although specific description will be provided below with reference to FIG. 28, there are various kinds of setting for sorting. In FIG. 21, a user can set desired two groups from among options.

In step S91, the setting menu is entered. In the second embodiment, the setting menu can be called by the pressing of the navigation key K3. In step S92, the first group is set by setting first sorting. In the second embodiment, the user selects an option using the wheel device WD1 and sets the first group using the OK button BT1. In step S93, the second group is set by setting second sorting. In the second embodiment, the user selects an option using the wheel device WD1 and sets the second group using the OK button BT1.

When the groups are set in such a way, the data elements can be displayed in two groups, as illustrated in FIG. 5.

The above-described method is an embodiment when the groups illustrated in FIG. 5 are sorted. The second embodiment is also an embodiment in which the home key K4 is not used when the state returns to the standby screen in data searching. In the second embodiment, the data elements data storage 30 can be sorted, and two sorted groups can be displayed.

In the second embodiment, depending on the type of data or condition, data elements are sorted as illustrated in FIG. 28. Also in the case where the data elements are sorted by a grouping condition or a condition for each device illustrated in FIG. 28, the manner is substantially the same as that in the foregoing description. The group is previously described in the first embodiment. An example grouping by devices will be described below in the third embodiment.

That is, in grouping of the second embodiment, as long as data elements can be arranged in two groups, it is not necessarily required to perform grouping by sorting described in the second embodiment. Specifically, as illustrated in FIG. 28, examples of the sorting condition include a combination of order of capture date and order of history of printing and a combination of order of capture date and order of face search.

In the case where data elements are grouped by a difference between devices, they may be divided into a group for an internal storage of the apparatus and a group for an external storage. That is, in the case where data elements are grouped by devices, data elements can be divided into those in an internal storage of the apparatus and those in an external storage. In other words, the data stored in the internal storage is data stored in the data storage portion 16, and the data stored in the external storage is data stored in the memory card MC1.

Third Embodiment

The third embodiment of the present invention is an embodiment in which the grouping illustrated in FIG. 5 is carried out by the type of a device. In the third embodiment, the other group of data elements is accessed by use of the wheel device WD1 in data searching.

The concept of displaying data on a screen in the third embodiment is substantially the same as that illustrated in FIGS. 1 to 10 in the first embodiment. However, it is noted that devices DA and DB are represented in place of the groups GA and GB. In the third embodiment, the flowcharts illustrated in FIGS. 23 to 26 are used in place of those in FIGS. 11 to 14, and a method of setting each device illustrated in FIG. 27 is used in place of the setting method illustrated in FIG. 15.

Figure 22A:
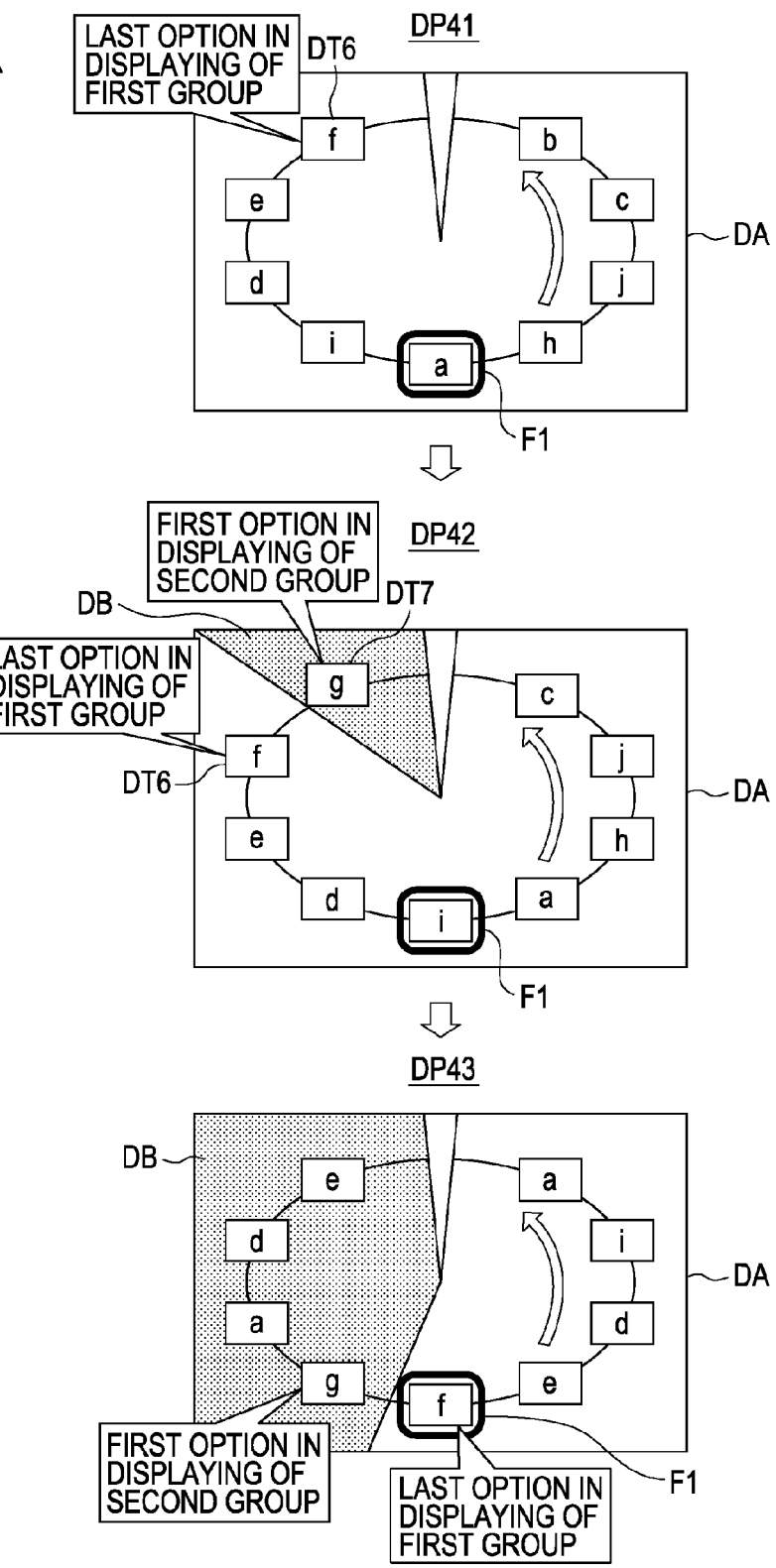

FIGS. 22A and 22B illustrate how the other group of data elements is accessed by use of the wheel device WD1 in data searching according to the third embodiment.

A standby screen DP41 for use in data searching is a data search screen that is rotatable left by the wheel device WD1 and that displays data elements of a first device DA. A data item DT6 is a data element of the device DA and is the last when data elements of the device DA are displayed in sequence. At this time, the focus F1 is placed on the data element "a" on the screen. In this state, when the wheel device WD1 is rotated left, the screen is changed to a screen DP42. The data element "f" being the data item DT6 moves on the screen DP42. At the location where the data item DT6 was present, the first data "g," which is the front in displaying of data elements of a device DB, is displayed as a data item DT7. As illustrated in the screen DP42, to indicate that it is a data element of the device DB, in response to the data element "g," the background of a region corresponding to the data element "g" is also changed to the background for searching data elements of the device DB.

When the wheel device WD1 is further rotated left, data elements of the device DB gradually appear. On a screen DP43, the focus F1 is placed on the last data element of the device DA. In this state, the first data element of the device DB is positioned left to the focus F1. When the wheel device WD1 is rotated left, as illustrated in a screen DP44, the displayed data elements are being switched from the data elements of the device DA to the data elements of the device DB. When the left-handed rotation continues, as illustrated in a screen DP45, the data elements of the device DB become selectable consecutively.

In such a way, a user can search data elements of the device DA and those of the device DB while viewing them in sequence. With the third embodiment, data elements can be searched highly effectively when the data elements are small in number. Also in the first and second embodiments, after the last image contained in a first group being searched, an image contained in a second group may be displayed.

Figure 23:
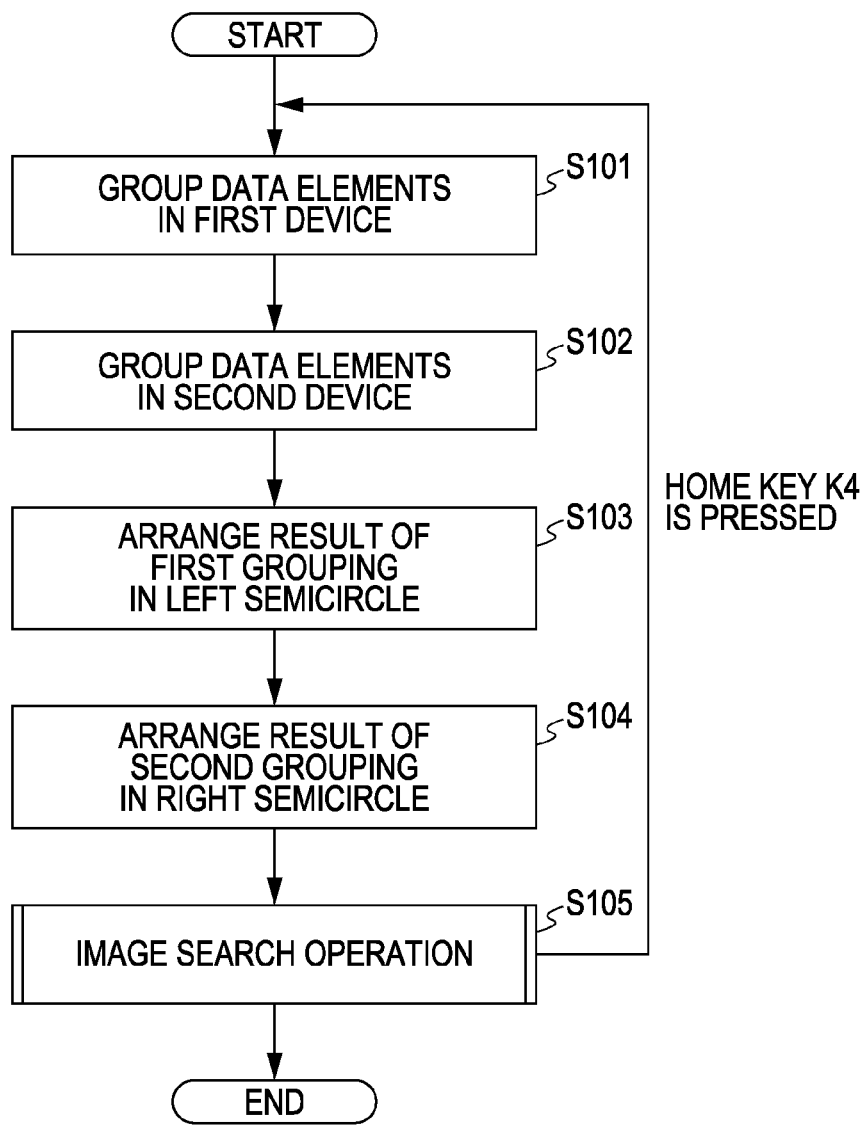
FIG. 23 is a flowchart of an example operation of selecting a data element from data elements stored in two devices according to the third embodiment.

FIG. 23 is a flowchart of an example operation of selecting a data element from data elements stored in two devices according to the third embodiment.

It is noted that the data elements are grouped by sorting. The sorting employs a sorting method using order of capture date and order of history of printing, as shown in FIG. 28.

Referring to FIG. 23, in step S101, data elements contained in a first device are grouped in a first group from among data elements stored in the data storage 30. In step S102, data elements contained in a second device are grouped in a second group from among the data elements stored in the data storage 30. Examples of the grouping corresponding to the first and second devices may include grouping corresponding to an internal storage in the apparatus and an external storage, as shown in FIG. 28. In this case, the data elements stored in the internal storage are the data elements retained in the data storage portion 16, and the data elements stored in the external storage are the data elements retained in the memory card MC1.

In step S103, the data elements of the result of grouping in step S101 are arranged in a left semicircle in sequence by the display method illustrated in FIG. 5. In step S104, the data elements of the result of grouping in step S102 are arranged in a right semicircle in sequence by the display method illustrated in FIG. 5.

In such a way, the results of two grouping operations are arranged and displayed in the circumference of a single circle.

In step S105, digital image data elements can be searched. The details of this process will be described below with reference to FIG. 24. When the home key K4 is pressed in step S105, flow returns to step S101. The screen returns from that for use in searching images to the standby screen, so the user can select a data element.

Figure 24:
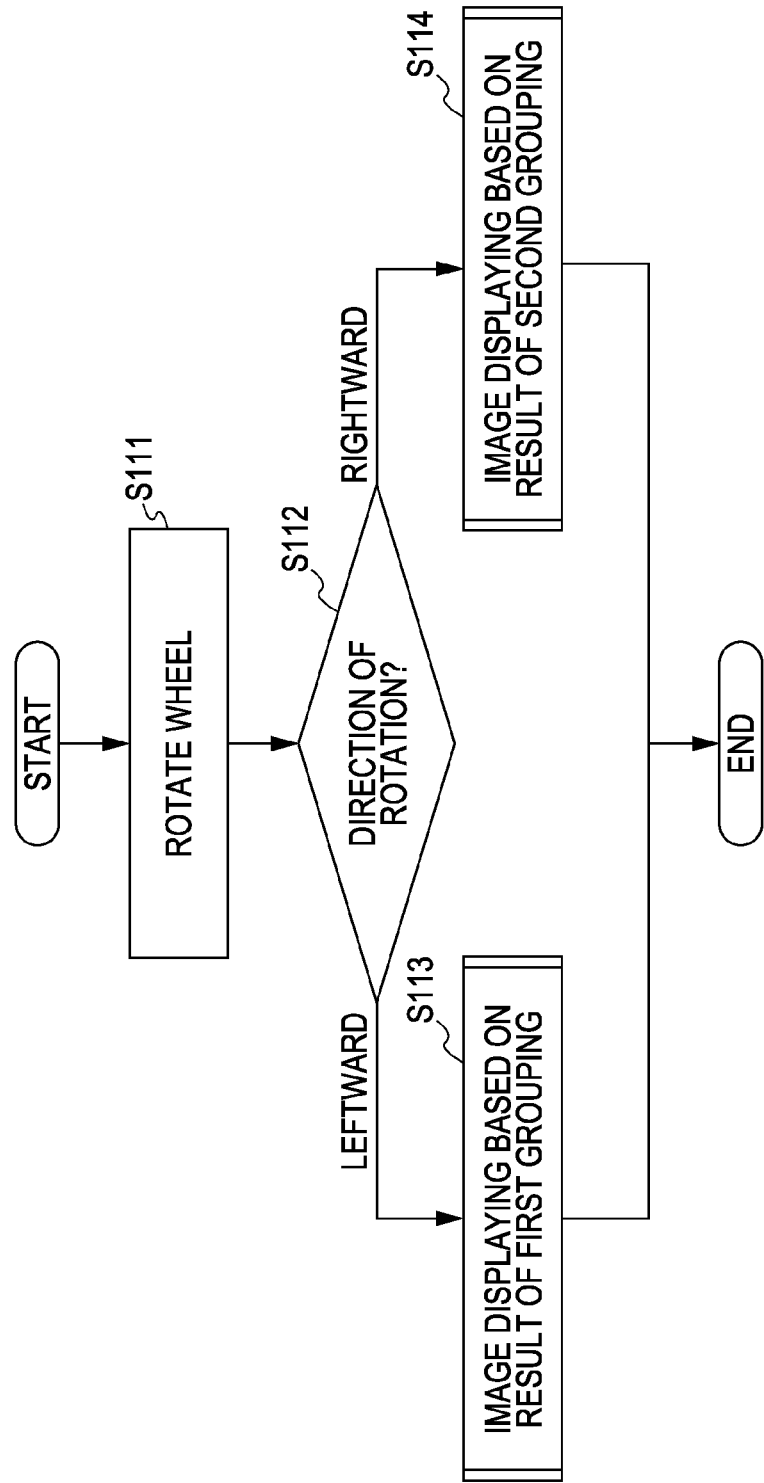
FIG. 24 is a flowchart of an example operation of selecting a data element according to the third embodiment.

FIG. 24 is a flowchart of an example operation from the initial screen according to the third embodiment.

This flowchart shows an operation of selecting a data element on a screen in which two groups of data elements are arranged in the circumference of a single circle, as illustrated in FIG. 5, by use of the wheel device WD1.

In step S111, rotation of the wheel device WD1 performed by the user is recognized. In step S112, the direction of the rotation of the wheel device WD1 is determined. If it is determined that the wheel device WD1 is rotated left (counterclockwise), flow proceeds to step S113. In step S113, data elements can be searched on the basis of the result of the grouping corresponding to the first device. The details of an operation of searching data elements of the result of the grouping corresponding to the first device will be described below with reference to FIG. 25. If, in step S112, it is determined that the wheel device WD1 is rotated right (clockwise), flow proceeds to step S114. In step S114, data elements can be searched on the basis of the result of the grouping corresponding to the second device. The details of an operation of searching data elements of the result of the grouping corresponding to the second device will be described below with reference to FIG. 26.

Figure 25:
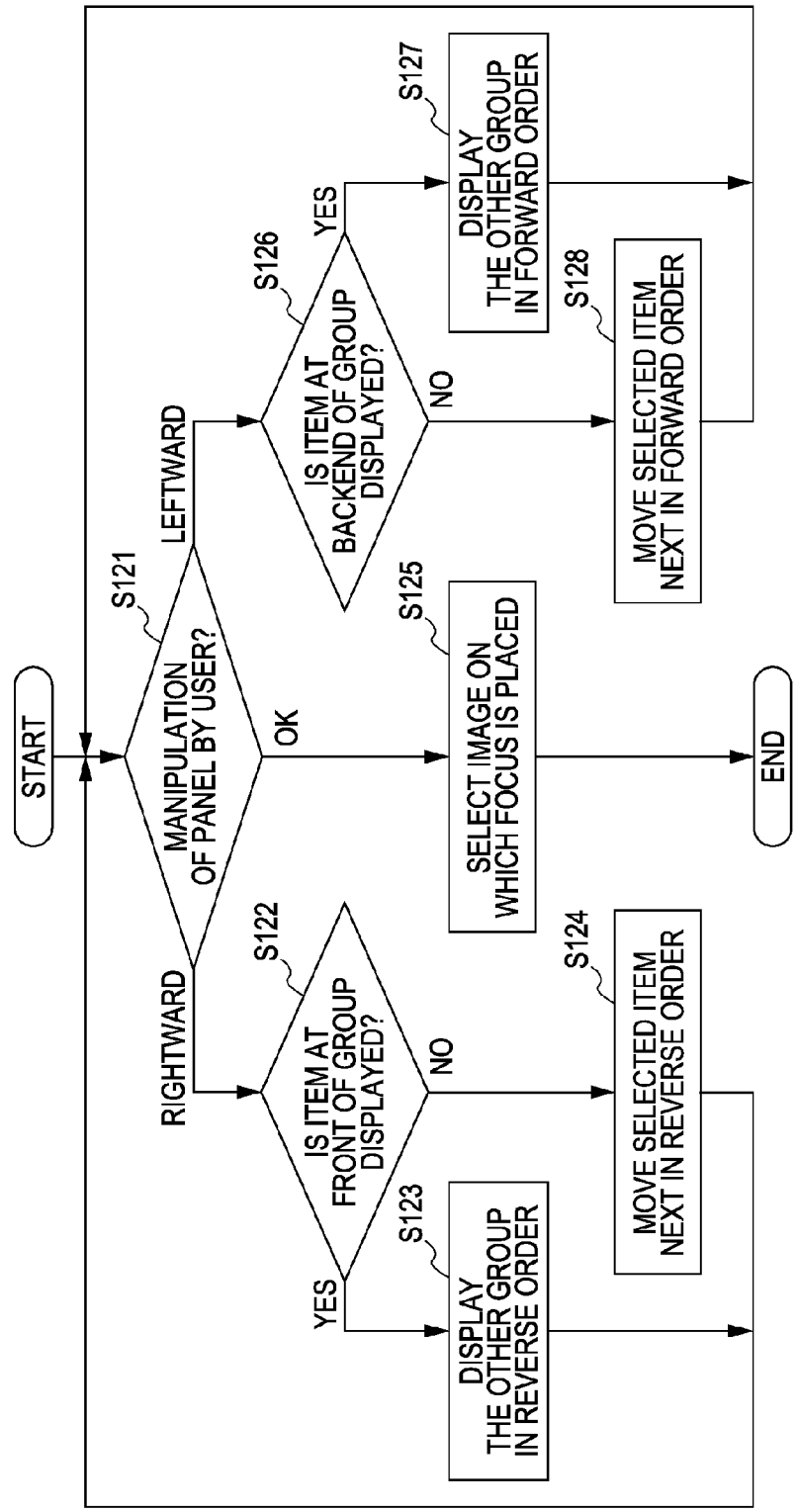
FIG. 25 is a flowchart of an example operation of searching data elements stored in the first device.

FIG. 25 is a flowchart of an example operation of searching data elements of the first device.

This flowchart shows an operation of searching images, as illustrated in FIGS. 22A and 22B, when the wheel device WD1 is rotated left on the standby screen.

In step S121, user manipulation of the panel is recognized. If the wheel device WD1 is rotated right (clockwise), flow proceeds to step S122, where it is determined whether a data item at the front (first data element) of a first group is displayed. If it is determined that the first data element is displayed (YES in step S122), flow proceeds to step S123. In step S123, the data elements in a second group are displayed in reverse order, subsequently to the first data element, and flow returns to step S121. If it is determined that the first data element in the first group is not displayed (NO in step S122), flow proceeds to step S124. In step S124, the selected item in the first group is moved next in reverse order to how the data elements were arranged, and flow returns to step S121 again.

If, in step S121, it is determined that the wheel device WD1 is rotated left (counterclockwise), flow proceeds to step S126, where it is determined whether an item at the backend (last data element) of the first group is displayed. If it is determined that the last data element is displayed (YES in step S126), flow proceeds to step S127. In step S127, the data elements in a second group are displayed in forward order, subsequently to the last data element, and flow returns to step S121 again. If it is determined that the last data element in the first group is not displayed (NO in step S126), flow proceeds to step S128. In step S128, the selected item in the first group is moved next in forward order in which the data elements were arranged, and flow returns to step S121 again.

The flowchart illustrated in FIG. 25 shows the operation executed when the wheel device WD1 is rotated left (counterclockwise) in FIG. 24. When it is rotated left (counterclockwise) in this way, the data elements are moved in forward order. Accordingly, a user can select a data element merely by continuing rotating the wheel device WD1 in the same direction through the standby screen DP1 illustrated in FIG. 5.

If the last item in a group of data elements is displayed, to select a data element from the next group of data elements, the operation illustrated in FIGS. 22A and 22B can be performed. Thus, in data searching, data elements of the other group can be searched using the wheel device WD1.

If, in step S121, the OK button BT1 is pressed by manipulation by the user, flow proceeds to step S125. In step S125, it is determined that the data element on which the focus F1 is placed is selected, and then flow is completed. If, in step S121, the home key K4 is pressed by manipulation by the user (not shown), flow is completed, and the initial standby screen DP41 is displayed, as described in step S105. That is, the screen returns to the standby screen from that for data searching, and the user can select a data element.

Figure 26:
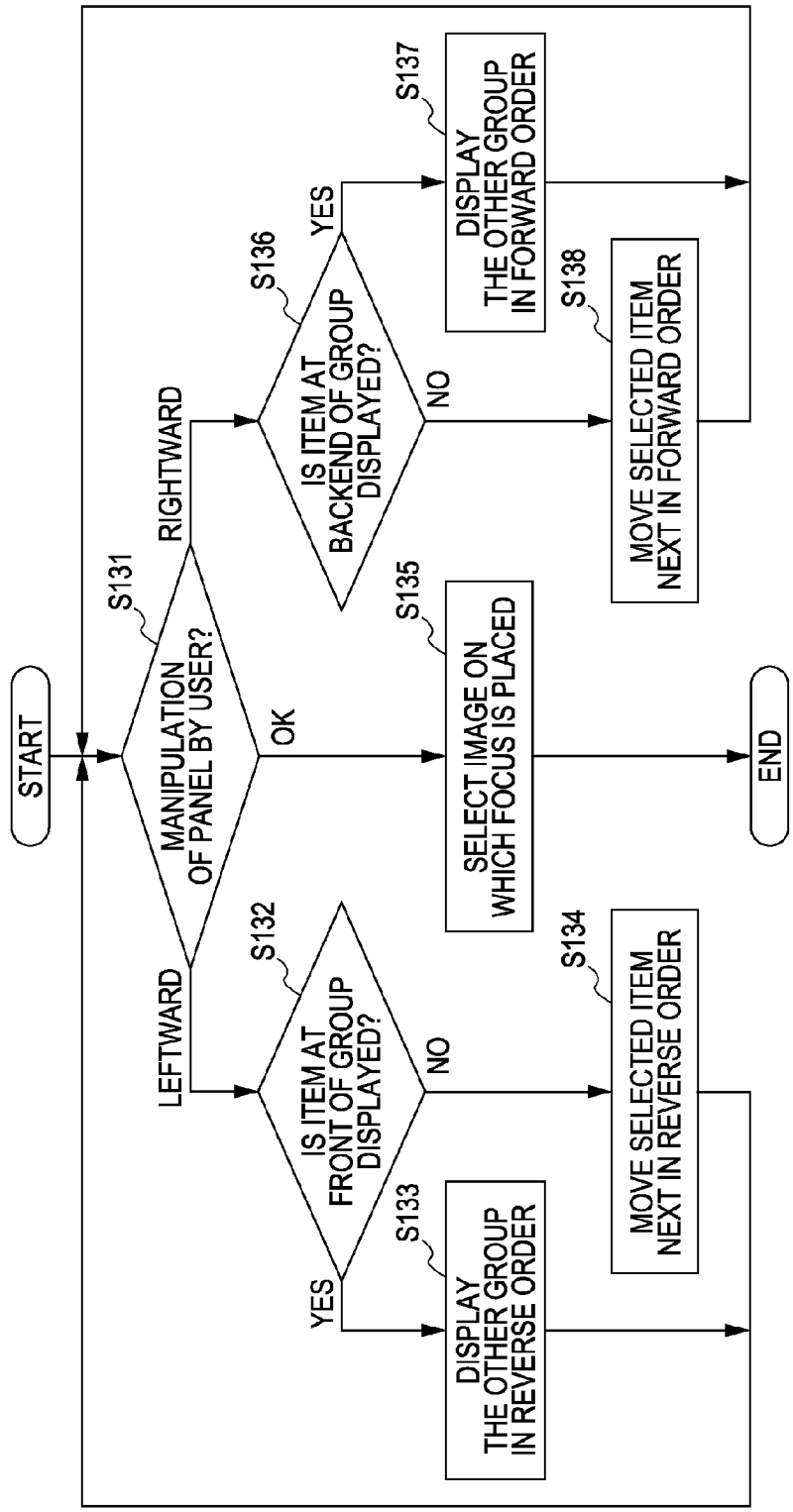
FIG. 26 is a flowchart of an example operation of searching data elements stored in the second device.
Figure 27:
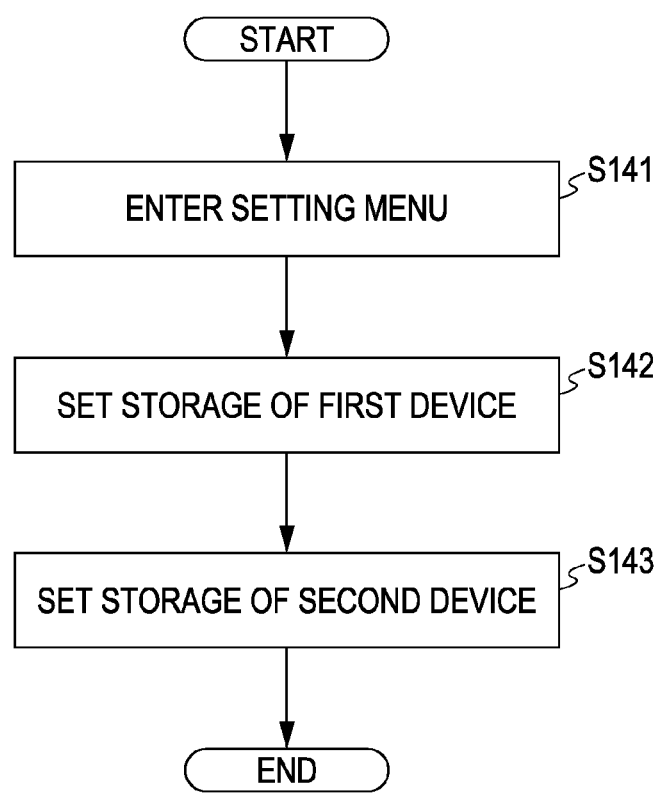
FIG. 27 is a flowchart of an example process for setting a device.

FIG. 26 is a flowchart of an example operation of searching data elements of the second device.

This flowchart shows an operation of searching images, as illustrated in FIGS. 22A and 22B, when the wheel device WD1 is rotated right on the standby screen.

In step S131, user manipulation of the panel is recognized. If the wheel device WD1 is rotated left (counterclockwise), flow proceeds to step S132, where it is determined whether a data item at the front (first data element) of a first group is displayed. If it is determined that the first data element is displayed (YES in step S132), flow proceeds to step S133. In step S133, the data elements in a second group are displayed in reverse order, subsequently to the first data element, and flow returns to step S131. If it is determined that the first data element in the first group is not displayed (NO in step S132), flow proceeds to step S134. In step S134, the selected item in the first group is moved next in reverse order to how the data elements were arranged, and flow returns to step S131.

If, in step S131, it is determined that the wheel device WD1 is rotated right (clockwise), flow proceeds to step S136, where it is determined whether an item at the backend (last data element) of the first group is displayed. If it is determined that the last data element is displayed (YES in step S136), flow proceeds to step S137. In step S137, the data elements in a second group are displayed in forward order, subsequently to the last data element, and flow returns to step S131 again. If it is determined that the last data element in the first group is not displayed (NO in step S136), flow proceeds to step S138. In step S138, the selected item in the first group is moved next in forward order in which the data elements were arranged, and flow returns to step S131 again.

The flowchart illustrated in FIG. 26 shows the operation executed when the wheel device WD1 is rotated right (clockwise) in FIG. 24. When it is rotated right (clockwise) in this way, the data elements are moved in forward order. Accordingly, a user can select a data element merely by continuing rotating the wheel device WD1 in the same direction from the standby screen DP1 illustrated in FIG. 5.

If the focus F1 is placed on the last item in a group of data elements, the operation of selecting a data element from the next group of data elements, as illustrated in FIGS. 22A and 22B, can be performed. Thus, in data searching, data elements of the other group can be searched using the wheel device WD1.

If, in step S131, the OK button BT1 is pressed by manipulation by the user, flow proceeds to step S135. In step S135, it is determined that the data element on which the focus F1 is placed is selected, and then flow is completed. If, in step S131, the home key K4 is pressed by manipulation by the user (not shown), flow is completed, and the initial standby screen DP41 is displayed, as described in step S105. That is, the screen returns to the standby screen from that for data searching, and the user can select a data element.

FIG. 27 illustrates an example of a process for setting a device.

In the third embodiment, as illustrated in FIG. 4, the data elements stored in the data storage 30 are ordered in each of the groups GA and GB. There are various examples of a condition for each of these groups. By use of a method illustrated in FIG. 15, a user can select a condition from among a plurality of options, and two groups can be set by the condition selected by the user.

In step S141, the setting menu is entered. In the third embodiment, the setting menu can be called by the pressing of the navigation key K3. In step S142, the storage of a first device is set, it is selected by use of the wheel device WD1, and then the selection is confirmed by use of the OK button BT1. In step S143, the storage of a second device is set, it is selected by use of the wheel device WD1, and then the selection is confirmed by use of the OK button BT1.

In such a way, in setting the storage of a device, a listing of data elements in two devices can be displayed, as illustrated in FIG. 5.

The third embodiment is an embodiment in which the grouping illustrated in FIG. 5 is carried out by the type of a device. In the third embodiment, the other group of data elements is accessed by use of the wheel device WD1 in data searching.

In the third embodiment, from among the data elements stored in the data storage 30, the data elements of the device DA and those of the device DB can be displayed, and examples of the devices are shown in FIG. 28. Also in the case where the data elements are grouped by grouping or sorting using a condition illustrated in FIG. 28, the manner is substantially the same as that in the foregoing description. The group is previously described above in the first embodiment, and the sorting is described above in the second embodiment.

That is, in grouping of the third embodiment, as long as data elements can be arranged in two groups, it is not necessary to limit to the devices DA and DB.

FIG. 28 illustrates specific examples of grouping, sorting, devices described in the first, second, and third embodiments.

As illustrated in this drawing, examples of the condition for a group include a combination of a still image and a movie image and a combination of JPEG data and PDF data. In the case of sorting, data elements can also be sorted by order of capture date and order of history of printing or by order of capture date and order of face search. As mentioned above in the first, second, and third embodiments, specific examples of each of grouping, sorting, and devices are provided in the table of FIG. 28. These examples are for illustration purpose only. The present invention is not limited to these examples as long as data elements are arranged in groups in a similar manner.

In the embodiments described above, the user instructs processing of selecting a group or switching an image to be focused through the wheel device. However, the user may also provide the above instruction using a key indicating a direction, such as the up/down/right/left key K5 illustrated in FIG. 2, for example. Further, the user may also provide the above instruction by manipulating a touch panel. This case is advantageous in that the user can perform processing more intuitively, because the user presses the screen on which an image is displayed.

In addition, in the above embodiments, images belonging to the first group and those belonging to the second group extracted from a plurality of images are displayed continuously in a circular shape on the standby screen. However, the present invention is not limited to these embodiments. For example, the images belonging to the first and those belonging to second groups may be displayed continuously in a U shape, or they may also be displayed continuously in a straight line.

An image data element is described as a displayed data element by way of example. The present invention is also applicable to the case where various icons corresponding to data are displayed.

In the above embodiments, a printer that includes a recording portion is assumed as the image display apparatus. However, the image display apparatus may also be a digital camera that includes an image pickup portion for obtaining an image. The image display apparatus may also be one that displays an image and that has no recording portion and no image pickup portion. In this case, it is not necessarily required for the image display apparatus to have a display portion, and the image display apparatus may also be an apparatus that displays an image on an external display screen.

Furthermore, the present invention can also be achieved by providing a system or a device with a storage medium (or a recording medium) which stores program code of software implementing the functions of the embodiments or by downloading the same from an external server (not illustrated) and by reading and executing the program code stored in the storage medium with a computer of the system or the device (a CPU or an micro processing unit (MPU)).

In this case, the program code itself, which is read from the storage medium, implements the functions of the embodiments mentioned above, and accordingly, the storage medium storing the program code constitutes the present invention.

As the storage medium for supplying such program code, a floppy disk, a hard disk, an optical disk, a magneto-optical disk, a digital versatile disc (DVD), a DVD-recordable (DVD-R), a DVD-rewritable (DVD-RW), a CD-ROM, a CD-R, a CD-rewritable (CD-RW), a magnetic tape, a nonvolatile memory card, a ROM, and an electrically erasable programmable ROM (EEPROM), for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-340543 filed Dec. 28, 2007, which is hereby incorporated by reference herein in its entirety.

What is claimed is:

1. An apparatus comprising:
   a first display control unit configured to cause a display screen to display each of a plurality of groups which includes one or more display items;
   a specifying unit configured, in accordance with a sliding operation for sliding an operation position by a user, to specify both of a sliding direction of the sliding operation and a sliding amount of the sliding operation;
   a selecting unit configured to execute both a group selection of a group corresponding to the sliding direction specified by the specifying unit from the plurality of groups displayed by the first display control unit, and an item selection of a display item corresponding to the sliding amount specified by the specifying unit from one or more display items which are included in the selected group selected by the group selection; and
   a second display control unit configured to cause the display screen to display the one or more display items which are included in the selected group selected by the group selection, in an arranged manner,
   wherein the selecting unit executes the item selection from the one or more display items displayed by the second display control unit, and
   wherein in a case where a sliding operation is executed in the state that a display item arranged at the end in an arranging order of the one or more display items is selected, the first display control unit causes the display screen to display each of the plurality of groups again and the selecting unit further executes the group selection.

2. The apparatus according to claim 1, further comprising a deciding unit configured to decide the display item selected by the item selection by the selecting unit as a target of a predetermined process, according to an instruction by the user which is different from the sliding operation,
   wherein the selecting unit executes the item selection as a selection of a candidate of the target decided by the deciding unit.

3. The apparatus according to claim 2, wherein the predetermined process is a printing process.

4. The apparatus according to claim 1, wherein the selecting unit further executes a movement of one or more display items which are displayed by the display control unit and are included in the selected group selected by the group selection, depending on the sliding amount, and executes the item selection of a display item corresponding to a movement amount of the movement.

5. The apparatus according to claim 1, wherein the second display control unit, if a group is selected from the plurality of groups by the selecting unit, causes the display screen to display a plurality of display items included in the selected group, by adding, to the one or more display items, at least one display item which is included in the selected group and is not displayed before the selection.

6. The apparatus according to claim 1, wherein the second display control unit causes, if a group is selected from the plurality of groups by the selecting unit, the display screen to display the one or more display items included in the selected group with a background color corresponding to the selected group.

7. The apparatus according to claim 1, wherein the second display control unit, if a group is selected from the plurality of groups by the selecting unit, causes the display screen to display the one or more display items included in the selected group so as not to display the plurality of display items which are displayed before the selection and are not included in the selected group on the display screen.

8. The image processing apparatus according to claim 1, wherein the first display control unit causes the display screen to display the plurality of groups in a plurality of areas of the display screen corresponding to the plurality of groups.

9. The apparatus according to claim 1, wherein the sliding operation is for sliding the operation position in a circular shape, and the specifying unit specifies the sliding direction and the sliding amount of the sliding operation.

10. The apparatus according to claim 9, wherein the sliding operation is performed on a wheel device by the user.

11. The apparatus according to claim 1, wherein the sliding operation is performed on a touch panel by the user.

12. The apparatus according to claim 1, wherein the apparatus is one of a digital camera and a printer for printing an image.

13. The apparatus according to claim 1, wherein the first display control unit causes the display screen to display a plurality of display items included in the plurality of groups, as the plurality of display groups.

14. The apparatus according to claim 13, wherein the first display control unit causes the display screen to display the plurality of display items so that the plurality of display items are continually arranged.

15. The apparatus according to claim 13, further comprising:
   a sorting unit configured to sort a plurality of display items into the plurality of groups in accordance with each attribution of a plurality of pieces of data corresponding to the plurality of display items,
   wherein the first display control unit causes the display screen to display the plurality of display items included in the plurality of groups sorted by the sorting unit.

16. The apparatus according to claim 15, wherein the sorting unit can sort the plurality of display items into the plurality of groups so as to include at least one image to overlap the two groups within the plurality of groups.

17. The apparatus according to claim 1, wherein the one or more display items are one of one or more images and one or more icons based on image data.

18. A method comprising:
   causing a display screen to display each of a plurality of groups which includes one or more display items; and
   executing, by a sliding operation for sliding an operation position by a user, both a group selection of a group, corresponding to a sliding direction of the sliding operation, from the plurality of groups, and an item selection of a display item corresponding to a sliding amount of the sliding operation, from one or more display items which are included in the selected group, wherein the one or more display items which are included in the selected group selected by the group selection, are displayed by the display screen in an arranged manner, wherein the item selection from the one or more display items displayed by the display screen is executed, and wherein in a case where a sliding operation is executed in the state that a display item arranged at the end in an arranging order of the one or more display items is selected, the display screen displays each of the plurality of groups again and the group selection is further executed.

19. A non-transitory computer-readable storage medium storing a computer executable process, the computer-executable process causing a computer to implement the method of claim 18.

* * * * *